US007894516B2

(12) United States Patent
Liang et al.

(10) Patent No.: US 7,894,516 B2
(45) Date of Patent: Feb. 22, 2011

(54) METHOD FOR EQUALIZING A DIGITAL SIGNAL AND EQUALIZER

(75) Inventors: Ying Chang Liang, Singapore (SG); Sumei Sun, Singapore (SG); Chin Keong Ho, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 531 days.

(21) Appl. No.: 11/573,639

(22) PCT Filed: Aug. 15, 2005

(86) PCT No.: PCT/IB2005/002430

§ 371 (c)(1),
(2), (4) Date: Sep. 11, 2007

(87) PCT Pub. No.: WO2006/018702

PCT Pub. Date: Feb. 23, 2006

(65) Prior Publication Data

US 2008/0187034 A1 Aug. 7, 2008

(51) Int. Cl.
*H04L 27/01* (2006.01)
(52) U.S. Cl. .................. 375/232; 375/229; 375/233
(58) Field of Classification Search .......... 375/229, 375/232, 233
See application file for complete search history.

(56) References Cited

U.S. PATENT DOCUMENTS 7,113,540 B2 * 9/2006 Yousef et al. ............... 375/233

2004/0125895 A1 7/2004 Buckley et al. ............. 375/340

FOREIGN PATENT DOCUMENTS

| EP | 1365554 | 1/2007 |
| WO | WO 99/65161 | 12/1999 |
| WO | WO 01/71996 | 9/2001 |
| WO | WO03/084092 A2 | 9/2003 |

OTHER PUBLICATIONS

Dinis, R.; Gusmao, A.; Esteves, N., "On Broadband Block Transmission Over Strongly Frequency-Selective Fading Channels", Proceedings of the Wireless 2003 Conference, Jul. 7-9, 2003, pp. 261-269.
Chan A. M. et al., "A Class of Block-Iterative Equalizers for Intersymbol Interference Channels", ICC 2000. 2000 IEEE International Conference on Communications. Conference Record. New Orleans, LA, Jun. 18-21, 2000, [IEEE International Conference on Communications], New York, NY: IEEE, US, Jun. 18, 2000, pp. 31-35.

(Continued)

*Primary Examiner*—David C Payne
*Assistant Examiner*—Leon Flores
(74) *Attorney, Agent, or Firm*—Paul J. Backofen, Esq.; Crockett & Crockett, PC

(57) ABSTRACT

A method for equalizing a digital signal received via at least one communication channel is described, wherein a block of received signal values is processed by a block-iterative equalizer (200). The equalizer comprises a feedback unit (202) and a feed-forward unit (201) each corresponding to the multiplication by a respective matrix. The matrices are updated in the iterative process.

19 Claims, 10 Drawing Sheets

OTHER PUBLICATIONS

Beheshti S. et al., "Joint Intersymbol and Multiple-Access Interference Suppression Algorithms for CDMA Systems", European Transactions on Telecommunications, Wiley & Sons, Chichester, GB, vol. 9, No. 5, Sep. 1, 1998, pp. 403-418.

Rui Dinis et al., "Iterative Block-DFE Techniques for Single-Carrier-Based Broadband Communications with Tranmit/Receive Space Diversity", Wireless Communication Systems, 2004, 1st International Symposium on Mauritius, Sep. 20-22, 2004, Piscataway, NJ, IEEE, Sep. 20, 2004, pp. 347-351.

Beheshti, S.H. Isabelle and G.W. Wornel, "Joint Intersymbol and Multiple Access Interference Suppression Algorithms for CDMA Systems," European Trans. Telecomm. Related Technol., vol. 9, pp. 403-418, Sep.-Oct. 1998.

A.M. Chan and G.W. Wornell, "A Class of Block-Iterative Equalizers for Intersymbol Interference Channels: Fixed Channel Results," IEEE Trans. on Communications, pp. 1966-1976, vol. 49, No. 11, Nov. 2001.

N. Benvenuto and S. Tomasin, "Block Iterative DFE for Single Carrier Modulation", Electronics Letters, pp. 1144-1145, vol. 38, No. 19, Sep. 2002.

R. Kalbasi, R. Dinis, D.D. Falconer and A.H. Banihashemi, "Layered Space-Time Receivers for Single Carrier Transmission with Iterative Frequency Domain Equalization", IEEE VTC—Spring '04, May 2004.

Albert M. Chan and Gregory W. Wornell, A Class of Block-Iterative Equalizers for Intersymbol Interference Channels, Communications, 2000. ICC 2000.2000 IEEE International Conf.

* cited by examiner

METHOD FOR EQUALIZING A DIGITAL SIGNAL AND EQUALIZER

FIELD OF THE INVENTION

The invention relates to a method for equalizing a digital signal and an equalizer.

BACKGROUND OF THE INVENTION

A MIMO (multiple input multiple output) system is a communication system with multiple antennas at both the transmit side and the receive side. If $n_T$ denotes the number of transmit antennas and $n_R$ denotes the number of receive antennas, a MIMO system achieves a channel capacity which is almost $N=\min(n_T, n_R)$ times of the capacity of a corresponding single antenna system.

To achieve this capacity of a MIMO system, a spatial multiplexing scheme has been proposed according to which one independent data stream is transmitted by each transmit antenna. Because of the cross-interference among the data streams, each receive antenna receives a combination of the transmitted data streams. It is a challenging task for the receiver to separate the transmitted data streams, especially when the signal dimension N is very large.

A single-antenna communication system usually suffers from inter-symbol interference (ISI) and multiple access interference (MAI). For example, in single carrier cyclic prefix (SCCP) based systems or WHT-OFDM (Walsh Hadamard transform orthogonal frequency division multiplexing) systems, the transmitted symbols interfere with each other, yielding severe ISI. Both MAI and ISI exist in code division multiple access (CDMA) systems.

In wired transmission systems such as in digital subscriber lines (DSL), multiple lines are bonded together, thus besides the severe ISI due to the long delay in each telephone line, cross-talk among different lines is another major impairment affecting the transmission quality.

For a MIMO system, the following input-output model can be used:

$$\underline{x} = \underline{H}\underline{s} + \underline{n} \quad (1)$$

where $\underline{s}$ denotes the transmitted signal vector, $\underline{x}$ denotes the received signal vector and $\underline{n}$ denotes the received noise vector. $\underline{H}$ denotes the channel matrix and represents the channel responses from the transmit side to the receive side. For clarity, it is assumed that $\underline{s}$, $\underline{x}$ and $\underline{n}$ are all $N \times 1$ and $\underline{H}$ is a $N \times N$ matrix.

The MIMO model given above represents a wide range of communication systems. In fact, the input-output relation can be derived either in time domain, frequency domain, spatial domain or any combination of them. For a MIMO antenna system working in flat fading environment, the channel matrix $\underline{H}$ represents the channel responses from each transmit antenna to each receive antenna. For a SCCP system, the channel matrix $\underline{H}$ is a circular matrix, the elements of which come from the time domain channel responses from the transmit antenna to the receive antenna.

In the above model, the transmitted signal vector $\underline{s}$ may consist of only user's information-bearing symbols, which are usually with the same modulation. For multiuser case, the transmitted symbols may use different modulation methods.

For a generic MIMO system, three types of interferences must be considered: multi-stream interference (MSI), inter-symbol interference (MSI), both from one user and MAI which comes from the other users.

Linear equalizers and nonlinear equalizers have been proposed to recover transmitted signals. Linear detectors, such as ZF (zero forcing) detectors and MMSE (minimum mean squared error) detectors and some nonlinear detectors, such as generalized decision feedback equalizers (GDFE) are simple for implementation, but achieve a detector performance far away from the maximum likelihood (ML) performance bound. When the signal dimension is very small, a nonlinear exhaustive search can be applied to achieve ML detection, where the number of candidates to be sought is $M^N$, where M is the constellation size of the modulated symbols. For large signal dimension, however, the exponential complexity of the ML detector makes it impractical for implementation.

Recently, much effort has been devoted in designing low-complexity non-linear receivers to achieve near-ML performance for MIMO systems. When the signal dimension is small and moderate, near ML detection can be achieved through closest lattice point search (CPS) techniques, such as sphere decoding, which have lower complexity than the brute force ML detector. The time and space complexity for CPS techniques grows dramatically with the increase of the signal dimension. Therefore, it becomes impractical to use CPS when the signal dimension goes to large, say over 100.

A block-iterative decision feedback equalizer (BI-DFE) method has been proposed for ISI/MAI cancellation in CDMA systems in [1] and for ISI channel equalization in single user systems in [2], assuming an infinite signal dimension. This method iteratively estimates the overall transmitted symbols and uses these decision-directed symbols to obtain a new set of symbol estimates by canceling out the interferences. As an iterative technique, for high SNR (signal to noise ratio) region and when the number of independent delay paths is sufficiently large, BI-DFE can achieve the matched filter bound (MFB) within three to five iterations.

BI-DFE was later extended to frequency domain equalization for SCCP systems in [3], and to layered space-time processing for multiple antenna SCCP systems [4], both with finite signal dimensions. For SCCP systems, the channel is a circular matrix. For multiple antenna SCCP systems, the interferences from the other users are cancelled out, thus the newly generated signal is actually a single user SCCP system, to which a BI-DFE is applied. Therefore, both extensions make use of the channel's known structure—circular matrix, which is not available in generic MIMO channels.

An object of the invention is to provide an improved method for equalizing a digital signal compared to prior art methods.

The object is achieved by a method for equalizing a digital signal and an equalizer with the features according to the independent claims.

SUMMARY OF THE INVENTION

A method for equalizing a digital signal received via at least one communication channel is provided, wherein the signal values of the received digital signal are grouped into at least one block of received signal values and the at least one block of received signal values is processed by an iterative equalizer. In two or more iterations, a block of equalized signal values for the block corresponding to the current iteration is generated and in two or more iterations the block of equalized signal values corresponding to a previous iteration is processed by a feedback unit which performs a multiplication by a first matrix. Further, in two or more iterations the at least one block of received signal values is processed by a feed-forward unit which performs a multiplication by a second matrix. In two or more iterations, the first matrix is updated and in two or more iterations, the second matrix is updated. Further, in two or more iterations, the block of equalized signal values corresponding to the current iteration is determined based on the combination of the output of the feed-forward unit and the output of the feedback unit for the current iteration.

Further, an equalizer according to the method for equalizing a digital signal described above is provided.

SHORT DESCRIPTION OF THE FIGURES

DETAILED DESCRIPTION

Figure 1:
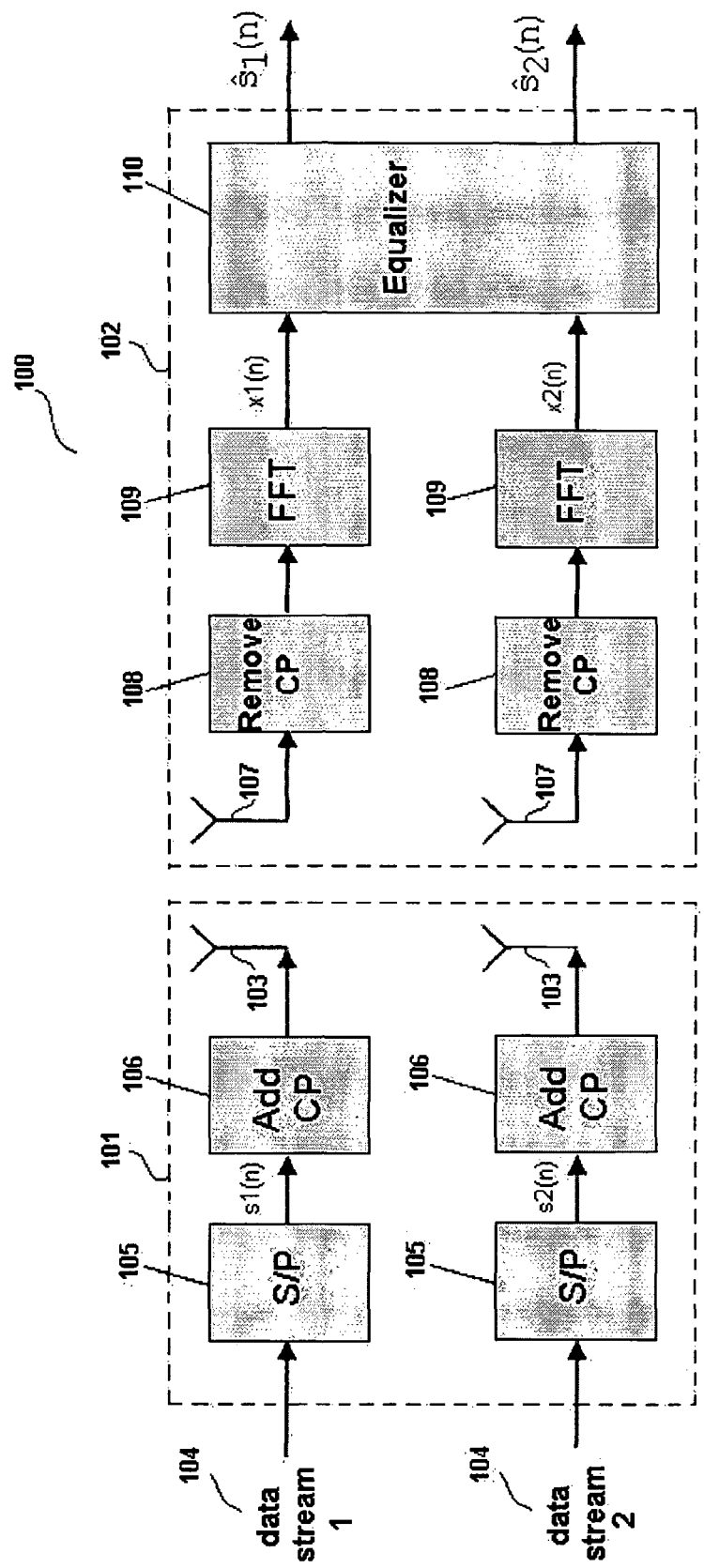
FIG. 1 shows a communication system according to an embodiment of the invention.

Illustratively, a block-iterative generalized decision feedback equalizer (BI-GDFE) is provided, wherein the feedback matrix and the feed-forward matrix are updated in the iterative process. The equalizer can be realized having low complexity since the feedback unit and the feed-forward unit can be implemented as one-tap filter units. In one embodiment, the equalizer coefficients are pre-calculated, such that the complexity is reduced further. In one embodiment, the equalizer is based on a singular value decomposition of the MIMO channel matrix (modelling the channel transmission characteristics). This embodiment can also be realized with low complexity, since only one singular value decomposition is involved.

With the invention, it becomes possible to achieve gigabit-level transmissions using large antenna systems for wireless applications or using large number of lines for wired transmissions, such as in DSL applications. The invention is for example applicable to communication systems compliant with IEEE 802.11n, i.e. for wireless local area networks, but may also be applicable to large area communication systems such as mobile telephone communication systems. The invention is e.g. applicable to communication systems compliant with WIMAX (Worldwide Interoperability for MicrowaveAccess) or B3G (beyond 3G) standards.

Near ML detection can be achieved for MIMO systems with large signal dimension.

Embodiments of the invention emerge from the dependent claims. The embodiments which are described in the context of the method for equalizing a digital signal are analogously valid for the equalizer.

The first matrix can be updated based on the result of at least one previous iteration. Similarly, the second matrix can be updated based on the result of at least one previous iteration.

A block of equalized signal values for the block corresponding to the iteration is for example generated in each iteration.

The first matrix and the second matrix may be both updated in two or more iterations.

The first matrix can be updated in each iteration. Similarly, the second matrix can be updated in each iteration.

In one embodiment, the first matrix and the second matrix are updated based on the correlation between the block of equalized signal values corresponding to a previous iteration and the block of received signal values. The update may also be performed based on a pre-estimation of the correlation.

The correlation between the block of equalized signal values corresponding to a previous iteration and the block of received signal values can be determined based on the equalized SINR of the previous iteration.

The correlation between the block of equalized signal values corresponding to a previous iteration and the block of received signal values is in one embodiment determined based on pre-determined correlation values.

The pre-determined correlation values may be generated by means of simulations.

The second matrix is for example updated based on a maximisation of the signal to interference and noise ratio (SINR). The first matrix is for example updated based on a minimisation of the interference.

In one embodiment, the received digital signal is a digital signal received via a MIMO system comprising a plurality of receive antennas and each receive antenna corresponds to exactly one component of the block of received signal values.

In one embodiment, in two or more iterations, the block of received signal values is processed by a first beamforming unit which performs a multiplication by a third matrix und wherein the block of equalized signal values corresponding to a previous iteration is processed by a second beamforming unit which performs a multiplication by a fourth matrix.

The third matrix and the fourth matrix for example correspond to a singular value decomposition of the channel matrix specifying the transmission characteristics of the communication channel.

The singular value decomposition of the channel matrix can be performed based on a decomposition of the channel matrix according to the subcarriers used in the communication channel.

The first matrix and the second matrix are in one embodiment generated according to the channel matrix specifying the transmission characteristics of the communication channel.

The communication channel is for example adapted according to MC-DS-CDMA, MC-CDMA, CP-CDMA or CP-DS-CDMA.

Illustrative embodiments of the invention are explained below with reference to the drawings.

FIG. 1 shows a communication system 100 according to an embodiment of the invention.

The communication system 100 comprises a transmitter 101 and a receiver 102. The transmitter 101 is formed according to a MIMO-SCCP (multiple input multiple output single carrier cyclic prefix) architecture, this means a SCCP system with MIMO antennas. For simplicity, the communication system 100 is a 2×2 MIMO system comprising two transmit antennas 103 wherein each transmit antenna 103 is used to transmit one data stream 104. The two data streams 104 in form of modulated symbols are each passed to a serial-to-parallel (S/P) converter 105. The S/P converters 105 generate blocks of data from the respective data streams 104. Let a block of data generated by the upper S/P converter 105 in FIG. 1 be denoted by $\underline{s}_1(n)$ and let a block of data generated by the lower S/P converter 105 in FIG. 1 be denoted by $\underline{s}_2(n)$ (assuming than $\underline{s}1(n)$ and $\underline{s}2(n)$ correspond to data that should be transmitted at the same time). $\underline{s}_1(n)$ and $\underline{s}_2(n)$ are vectors of size N×1 and are also referred to as the transmitted signal vectors in the following.

To each block of data $\underline{s}_1(n)$ and $\underline{s}_2(n)$ there is added a cyclic prefix of length L by a respective cyclic prefix adding unit 106. Finally, the blocks of data are each passed to a respective parallel-to-serial (P/S) converter (not shown in FIG. 1) which generates a serial symbol stream from each block. Each serial symbol stream is then sent by a respective transmit antenna 103.

The serial symbol streams are received by the receiver 102 via respective receive antennas 107. Each received serial symbol stream is first passed to a respective S/P converter (not shown in FIG. 1) to generate a block of symbols from each received serial symbol stream. The cyclic prefix is removed from each block of symbols by a respective cyclic prefix removal unit 108 and a fast Fourier transform (FFT) is applied to each block of symbols by a respective FFT unit 109 such that a received signal vector is generated corresponding to each transmitted signal vector. Let the received signal vector corresponding to the transmitted signal vector $\underline{s}_1(n)$ be denoted by $\underline{x}_1(n)$ and let the received signal vector corresponding to the transmitted signal vector $\underline{s}_2(n)$ be denoted by $\underline{x}_2(n)$.

The received signal vectors $\underline{x}_1(n)$ and $\underline{x}_2(n)$ are each fed to an equalizer 110. From $\underline{x}_1(n)$ the equalizer 110 generates a detected (equalized) signal vector $\hat{\underline{s}}_1(n)$ and from $\underline{x}_2(n)$ the equalizer 110 generates a detected (equalized) signal vector $\hat{\underline{s}}_2(n)$.

In the following, the function of the equalizer 110 is described according to various embodiments of the invention.

Figure 2:
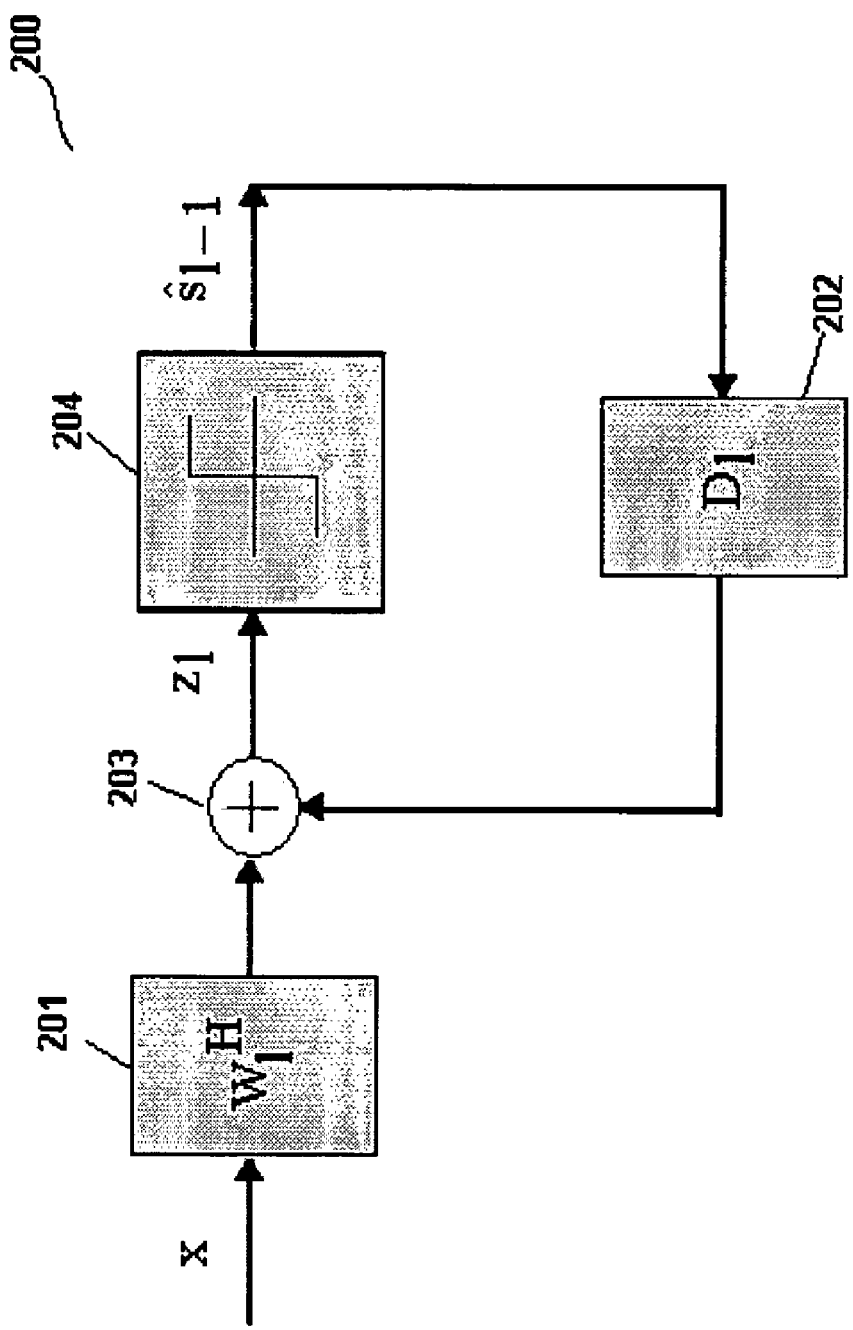
FIG. 2 shows an equalizer according to an embodiment of the invention.

FIG. 2 shows an equalizer 200 according to an embodiment of the invention.

The equalizer 200 is an iterative equalizer. In the following, l is used as the iteration index. The input of the equalizer 200 is a received signal vector, as explained with reference to FIG. 1, denoted by $\underline{x}$.

At the lth iteration, the received signal vector $\underline{x}$ is passed to a feed-forward equalizer (FFE) 201 which performs a multiplication of $\underline{x}$ by the matrix $\underline{W}_l^H$. Further, at the lth iteration, the hard decision from the previous, l−1th, iteration, this means the signal vector detected according to the l−1th iteration $\hat{\underline{s}}_{l-1}(n)$ is fed to a feedback equalizer (FBE) 202 which performs an multiplication of $\hat{\underline{s}}_{l-1}(n)$ by the matrix $\underline{D}_l$. The output of the feed-forward equalizer 201 and the output of the feedback equalizer 202 are combined (added) by an adder (combiner) 203 to generate a vector $\underline{z}_l$.

The vector $\underline{z}_l$ is fed to a slicer 204 which generates the hard decision for the lth iteration $\hat{\underline{s}}_l(n)$.

Mathematically, the input to the slicer 204 at the lth iteration is given by $$\underline{z}_l = \underline{W}_l^H \underline{x} + \underline{D}_l \hat{\underline{s}}_{l-1} \quad (2)$$

Since $\underline{x} = \underline{H}\underline{s} + \underline{n}$, let $$\underline{\alpha}_l = \text{diag}(\underline{W}_l^H \underline{H}) \quad (3)$$

be the diagonal matrix comprising the diagonal elements of the matrix $\underline{W}_l^H \underline{H}$. Then, $$\underline{z}_l = \underline{\alpha}_l \underline{s} + (\underline{W}_l^H \underline{H} - \underline{\alpha}_l) \underline{s} + \underline{D}_l \hat{\underline{s}}_{l-1} + \underline{W}_l^H \underline{n}. \quad (4)$$

Let $\underline{C}_l = \underline{W}_l^H \underline{H} - \underline{\alpha}_l$ and $\tilde{\underline{n}} = \underline{C}_l \underline{s} + \underline{D}_l \hat{\underline{s}}_{l-1} + \underline{W}_l^H \underline{n}$, then the covariance matrix of the composite interference plus noise is given by $$\begin{aligned} E[\tilde{n}\tilde{n}^H] &= E\left[(C_1 s + D_1 \hat{s}_{l-1} + W_1^H n)(C_1 s + D_1 \hat{s}_{l-1} + W_1^H n)^H\right] \\ &= \sigma_s^2 C_1 C_1^H + C_1 E[s \hat{s}_{l-1}^H] D_1^H + D_1 E[\hat{s}_{l-1} s^H] C_1^H + \\ &\quad \sigma_s^2 D_1 D_1^H + \sigma_n^2 W_1^H W_1 \\ &= \sigma_s^2 (1 - \rho_{l-1}^2) C_1 C_1^H + \sigma_s^2 (\rho_{l-1} C_1 + D_1)(\rho_{l-1} C_1 + D_1)^H + \\ &\quad \sigma_n^2 W_1^H W_1 \end{aligned} \quad (5)$$

where $\rho_{l-1}$ is the correlation between the decisions made at the (l−1)th iteration with the input, also called input-decision correlation. To minimize the interference effect, $\underline{W}_l$ is chosen in the lth iteration according to $$(\rho_{l-1}\underline{C} + \underline{D}_l) = 0 \Rightarrow \underline{D}_l = -\rho_{l-1}\underline{C} = \rho_{l-1}(\underline{\alpha}_l - \underline{W}_l^H \underline{H}) \quad (6)$$

Intuitively, for a given FFE, the FBE is chosen to minimize the interference effect.

The FFE (given by $\underline{W}_l$) is in the lth iteration chosen such that the SINR is maximized according to $$\underline{W}_l = [\sigma_s^2(1-\rho_{l-1}^2)\underline{H}\underline{H}^H + \sigma_n^2 \underline{I}]^{-1} \sigma_s^2 \underline{H} \quad (7)$$

Altogether, the algorithm for weight generation, i.e. for determining $\underline{W}_l$ and $\underline{D}_l$ is given by the following (1) Set l=0 and $\rho_0$ for initialization (2) In the lth iteration, use $\rho_{l-1}$ for calculating $\underline{W}_l$ and $\underline{D}_l$ according to (7) and (6)

(3) Perform processing as described to generate $\hat{s}_l$ and continue with the next iteration (i.e., go to (2)).

In one embodiment, the FFE and FBE coefficients and the correlation coefficients, i.e., $\underline{W}_l$, $\underline{D}_l$ and $\rho_{l-1}$ are pre-calculated when the channel responses, i.e., $\underline{H}$, have been estimated first.

Figure 3:
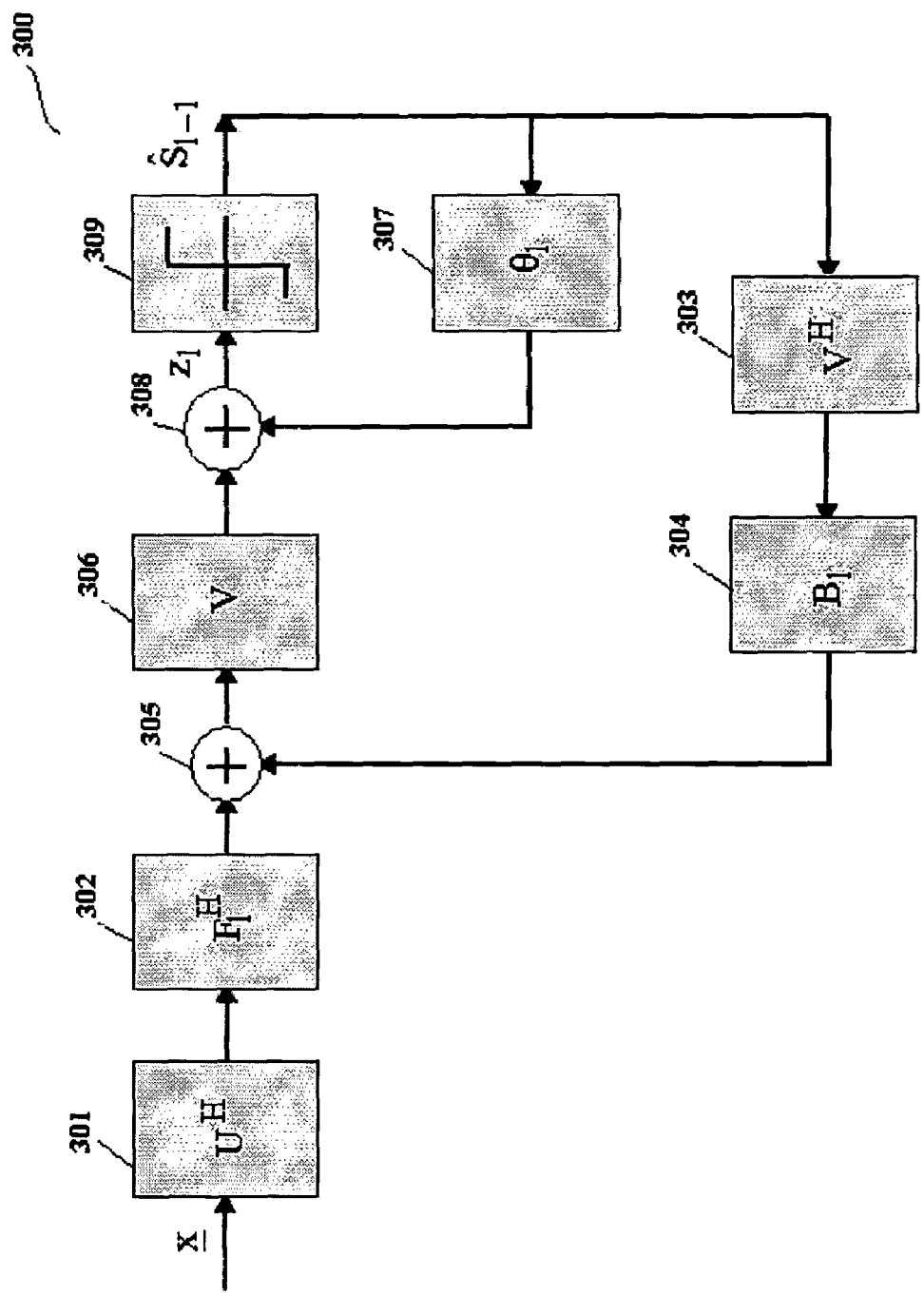
FIG. 3 shows an equalizer according to an embodiment of the invention.

FIG. 3 shows an equalizer 300 according to an embodiment of the invention.

As alternative to the equalizer 200 described above with reference to FIG. 2, the equalizer 300 is chosen for the equalizer 110 in the receiver 102 in one embodiment of the invention.

The equalizer 300 is also an iterative equalizer. As above, l is used as the iteration index. The input of the equalizer 200 is a received signal vector, as explained with reference to FIG. 1, denoted by $\underline{x}$.

The equalizer 300 is based on a singular value decomposition of the matrix $\underline{H}$ according to $$\underline{H} = \underline{U}\underline{\Sigma}\underline{V}^H \quad (8)$$

Using this, $\underline{W}_l$ according to equation (7) can be written as $$\underline{W}_l = \underline{U}\underline{F}_l \underline{V}^H \quad (9)$$

where $$\underline{F}_l = \sigma_s^2 [\sigma_s^2(1-\rho_{l-1}^2)\underline{\Sigma}\underline{\Sigma}^H + \sigma_n^2 \underline{I}]^{-1} \underline{\Sigma} \quad (10)$$

is a diagonal matrix.

Similarly, $D_l$ according to (6) can be written as $$\underline{D}_l = \rho_{l-1}(\underline{\alpha}_l - \underline{W}_l^H \underline{H}) = \rho_{l-1}(\overline{\alpha}_l \underline{I} - \underline{W}_l^H \underline{H}) + \rho_{l-1}(\underline{\alpha}_l - \overline{\alpha}_l \underline{I}) \quad (11)$$

where $$\overline{\alpha}_1 = \frac{1}{N} \operatorname{Trace}(\underline{W}_1^H \underline{H}).$$

Substituting (8) and (9) into (11) yields $$\underline{D}_1 = \underline{\rho}_{1-1}(\overline{\alpha}_1 I - \underline{V}\underline{F}_1^H \underline{\Sigma}\underline{V}^H) + \underline{\rho}_{1-1}(\alpha_1 - \overline{\alpha}_1 I) \quad (12)$$

$$= \underline{\rho}_{1-1}\underline{V}(\overline{\alpha}_1 I - \underline{F}_1^H \underline{\Sigma})\underline{V}^H + \underline{\rho}_{1-1}(\alpha_1 - \overline{\alpha}_1 I)$$

$$= \underline{V}\underline{B}_1\underline{V}^H + \underline{\rho}_{1-1}(\alpha_1 - \overline{\alpha}_1 I)$$

where $\underline{B}_l = \underline{\rho}_{l-1}(\overline{\alpha}_l I - \underline{F}_l^H \underline{\Sigma})$ and $\underline{\theta}_l = \underline{\rho}_{l-1}(\alpha_l - \overline{\alpha}_l I)$ and both are diagonal matrices.

Accordingly, the slicer input $\underline{z}_l$ can be written as $$\underline{z}_1 = \underline{V}\underline{F}_1^H \underline{U}^H \underline{x} + (\underline{V}\underline{B}_1\underline{V}^H + \underline{\theta}_1)\hat{s}_{1-1} \quad (13)$$

$$= \underline{V}(\underline{F}_1^H \underline{U}^H \underline{x} + \underline{B}_1 \underline{V}_1^H)\hat{s}_{1-1} + \underline{\theta}_1 \hat{s}_{1-1}$$

According to this expression of the slicer input $\underline{z}_l$, the received signal vector $\underline{x}$ is fed to a first (receiver) beamforming unit 301, which performs a multiplication of $\underline{x}$ by the matrix $\underline{U}^H$. The output of the beamforming unit 301 is supplied to a feed-forward (one-tap) equalizer 302 which performs a multiplication by the matrix $\underline{F}_l^H$.

The decision-directed signal vector estimate which was made at the (l−1)th iteration, i.e., the hard decision of the (l−1)th iteration $\hat{s}_{l-1}$ is supplied to a second beamforming unit 303 where it is multiplied by the beamforming matrix $\underline{V}^H$.

The output of the second beamforming unit 303 is processed by a feedback (one-tap) equalizer 304 which performs a multiplication by the matrix $\underline{B}_l$. The output of the feed-forward equalizer 302 and the output of the feedback equalizer 304 are combined (added) by a first adder 305, the output of which is processed by a third beamforming unit 306 which performs a multiplication by the matrix $\underline{V}$.

Further, $\hat{s}_{l-1}$ is passed to a further (one-tap) equalizer 307 which performs a multiplication by the matrix $\underline{\theta}_l$. The output of the third beamforming unit 306 and the further equalizer 307 are combined (added) by a second adder 308. The output of the second adder 308 is the input $\underline{z}_l$ to a slicer 309 which uses the input to make a hard decision for the lth iteration, i.e. generates $\hat{s}_l$.

According to equations (8) and (9), $\underline{W}_l^H \underline{H} = \underline{V}\underline{F}_l^H \underline{\Sigma}\underline{V}^H$. If all the elements of $\underline{V}$ are of the same amplitude, then $\underline{\alpha}_l = \operatorname{diag}(\underline{W}_l^H \underline{H}) = \overline{\alpha}_l I$, where $$\overline{\alpha}_l = \frac{1}{N} \operatorname{Trace}(\underline{F}_l^H \underline{\Sigma}).$$

In this case $\underline{\theta}_l = 0$.

For generic MIMO channels, $\underline{\alpha}_l = \operatorname{diag}(\underline{W}_l^H \underline{H}) \neq \overline{\alpha}_l I$, because the elements of $\underline{V}$ do not have the same amplitude. In this case, $\underline{\theta}_l \neq 0$. Therefore, $\operatorname{diag}(\underline{W}_l^H \underline{H})$ needs to be calculated, which requires $N^2$ complex multiplications.

Figure 4:
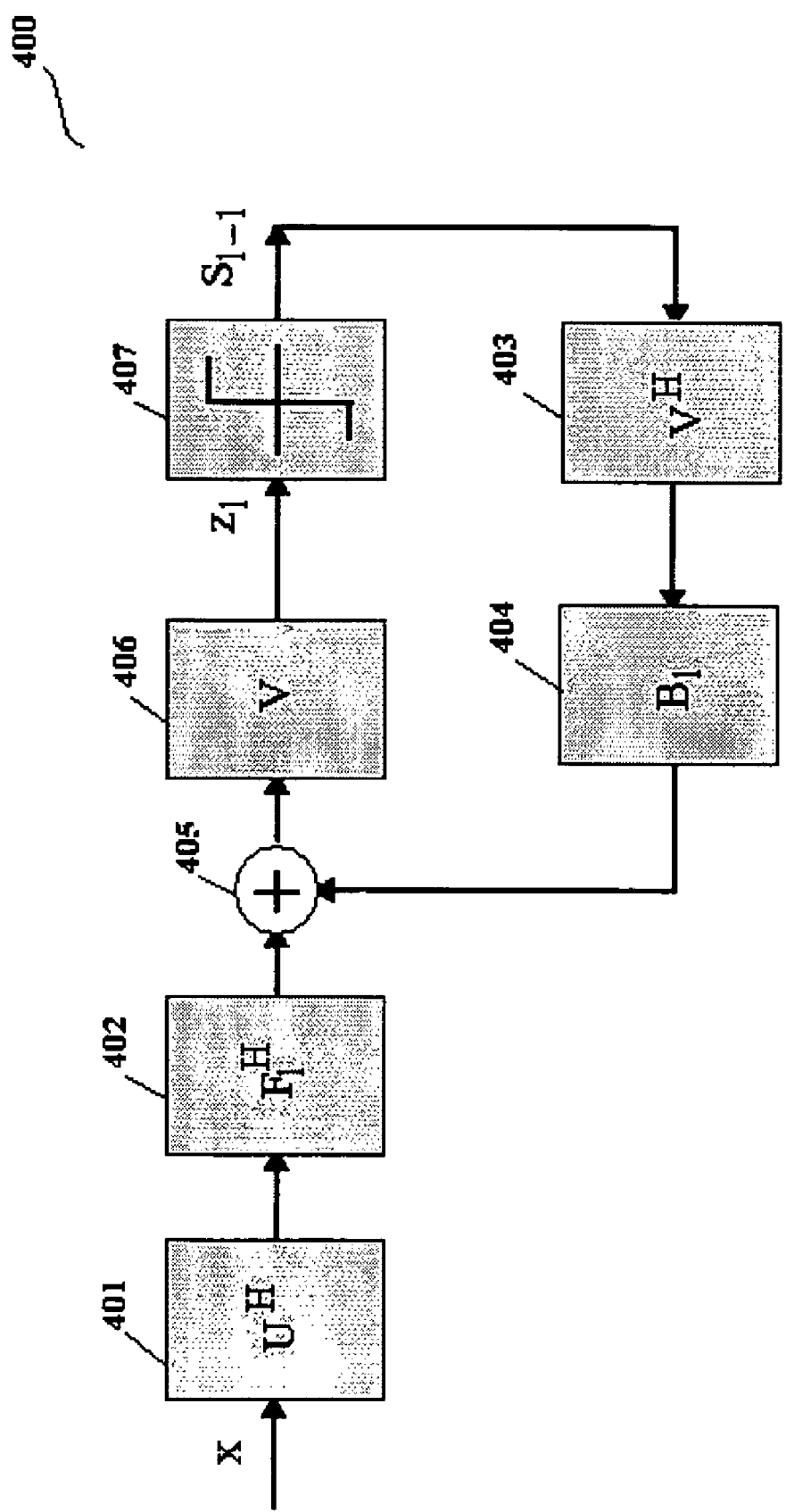
FIG. 4 shows an equalizer according to an embodiment of the invention.

A further alternative to the equalizer 200 described above with reference to FIG. 2 is shown in FIG. 4.

FIG. 4 shows an equalizer 400 according to an embodiment of the invention.

The equalizer 400 can be used as the equalizer 110 in the receiver 102 in one embodiment of the invention.

The equalizer 400 is illustratively a simplification of the equalizer 300 described above. The simplification is achieved by choosing $\underline{\theta}_l = 0$ and $$\overline{\alpha}_l = \frac{1}{N} \operatorname{Trace}(\underline{F}_l^H \underline{\Sigma}).$$

According to this simplification, the received signal vector $\underline{x}$ is fed to a first beamforming unit 401, which performs a multiplication of $\underline{x}$ by the beamforming matrix $\underline{U}^H$. The output of the beamforming unit 401 is supplied to a feed-forward (one-tap) equalizer 402 which performs a multiplication by the matrix $\underline{F}_l^H$.

The decision-directed signal vector estimate which was made at the (l−1)th iteration, i.e., the hard decision of the (l−1)th iteration $\hat{s}_{l-1}$ is supplied to a second beamforming unit 403 where it is multiplied by the beamforming matrix $\underline{V}^H$.

The output of the second beamforming unit 403 is processed by a feedback (one-tap) equalizer 404 which performs a multiplication by the matrix $\underline{B}_l$. The output of the feed-forward equalizer 302 and the output of the feedback equalizer 304 are combined (added) by a first adder 305, the output of which is processed by a third beamforming unit 306 which performs a multiplication by the matrix $\underline{V}$.

The output of the third beamforming unit 306 is the input $\underline{z}_l$ to a slicer 407 which uses the input to make a hard decision for the lth iteration, i.e. generates $\hat{s}_l$.

The SINR (signal to interference and noise ratio) at the lth iteration can also be simplified to $$\operatorname{SINR}_1 = \frac{N\overline{\alpha}_1^2 \sigma_s^2}{\operatorname{Tr}(\sigma_s^2(1-\rho_{1-1}^2)/\rho_{1-1}^2 \underline{B}_1^H \underline{B}_1 + \sigma_n^2 \underline{E}_1 \underline{E}_1^H)}.$$

Since $\underline{F}_l$, $\underline{B}_l$ and $\underline{\Sigma}$ are all diagonal matrices, the trace calculation is very simple.

Because of the cyclic prefix adding, the received signal vectors $\underline{x}_1(n)$ and $\underline{x}_2(n)$ can be written as $$\underline{x}_1(n) = \underline{\Lambda}_{11}\underline{W}\underline{s}_1(n) + \underline{\Lambda}_{21}\underline{W}\underline{s}_2(n) + \underline{u}_1(n)$$

$$\underline{x}_2(n) = \underline{\Lambda}_{12}\underline{W}\underline{s}_1(n) + \underline{\Lambda}_{22}\underline{W}\underline{s}_2(n) + \underline{u}_2(n)$$

where $\underline{x}_i(n)$, $\underline{s}_i(n)$ and $\underline{u}_i(n)$ are all column vectors with dimension N×1, and $\underline{W}$ is the DFT (discrete Fourier transform) matrix and $\underline{\Lambda}_{ij}$ is a diagonal matrix containing the frequency domain channel responses from the ith transmit antenna to the jth receive antenna.

Therefore, the input-output relation can be written as $$\underline{x}(n) = \underline{H}\underline{s}(n) + \underline{u}(n) \quad (14)$$

where $$\underline{x}(n) = \begin{bmatrix} \underline{x}_1(n) \\ \underline{x}_2(n) \end{bmatrix}, \ \underline{s}(n) = \begin{bmatrix} \underline{s}_1(n) \\ \underline{s}_2(n) \end{bmatrix}, \ \underline{u}(n) \begin{bmatrix} \underline{u}_1(n) \\ \underline{u}_2(n) \end{bmatrix} \text{ and}$$

$$\underline{H} = \overline{\underline{\Lambda}}\,\overline{\underline{W}}, \text{ where } \overline{\underline{\Lambda}} = \begin{bmatrix} \Lambda_{11} & \Lambda_{21} \\ \Lambda_{12} & \Lambda_{22} \end{bmatrix} \text{ and } \overline{\underline{W}} = \begin{bmatrix} W & 0 \\ 0 & W \end{bmatrix}$$

According to the input-output relation (14) the equalizer according to the embodiments described with reference to FIG. 2, FIG. 3 and FIG. 4 can be used. When using the embodiments according to FIG. 3 and FIG. 4, one could expect that since the matrix dimension of $\underline{H}$ is 2N×2N, the computation would be very complex. However, as will be seen below, the receiver 102 can be very effective when use of the matrix structure property is made.

$\underline{H}=\underline{\Lambda}\underline{W}$ and $\underline{W}$ is a unitary matrix. Therefore, doing singular value decomposition or matrix inversion for $\underline{H}$ can be implemented by doing singular value decomposition or matrix inversion for the block diagonal matrix $\underline{\Lambda}$. Further, because of the block diagonality of $\underline{\Lambda}$, the singular value decomposition or the matrix inversion of the matrix $\underline{H}$ can be done sub-carrier by sub-carrier, similar to MIMO-OFDM systems.

Let $$\underline{\Lambda}=\tilde{\underline{U}}\tilde{\underline{\Lambda}}\tilde{\underline{V}}^H$$

be a singular value decomposition of $\underline{\Lambda}$. Similarly, let $$\underline{H}_k = \begin{bmatrix} \Lambda_{11}(k) & \Lambda_{21}(k) \\ \Lambda_{12}(k) & \Lambda_{22}(k) \end{bmatrix} = \underline{U}_k \underline{\Sigma}_k \underline{V}_k^H, \quad k=0,1,\ldots,N-1$$

be a singular value decomposition of the channel matrix corresponding to each subcarrier, denoted by $\underline{H}_k$.

It is easy to verify that the unitary matrix $\tilde{\underline{U}}$ is determined by the matrices $\underline{U}_k$, the unitary matrix $\tilde{\underline{V}}$ is determined by the matrices $\underline{V}_k$ and the diagonal matrix $\tilde{\underline{\Lambda}}$ is determined by the singular values of the matrices $\underline{H}_k$, i.e., by $\underline{\Sigma}_k$ (k=0, 1, ..., N−1).

As an example to illustrate this, let the block diagonal matrix $\underline{H}$ be (in this example the frequency domain block size N=2 and the spatial domain size is 2×2):

$$\underline{H} = \begin{bmatrix} 0.4117+0.4008i & 0.0481-0.5663i & 0 & 0 \\ 0.6456-0.1820i & 0.3024-0.1448i & 0 & 0 \\ 0 & 0 & -0.4081-0.1638i & -0.5830-0.7364i \\ 0 & 0 & -0.3130+1.0168i & -0.6199+0.2787i \end{bmatrix}$$

When singular value decompostion $\underline{H}=\underline{U}\,\underline{S}\,\underline{V}$ is performed one gets:

$$\underline{U} = \begin{matrix} -0.0000-0.0000i & -0.6569-0.3681i & -0.5577+0.3491i & -0.0000+0.0000i \\ -0.5683-0.2481i & 0 & 0 & -0.7741-0.1278i \\ 0.0000-0.0000i & -0.6579+0.0124i & 0.34191-0.6673i & -0.0000-0.0000i \\ -0.3894+0.6811i & 0 & 0 & 0.1662-0.5974i \end{matrix}$$

$$\underline{S} = \begin{matrix} 1.5673 & 0 & 0 & 0 \\ 0 & 0.9727 & 0 & 0 \\ 0 & 0 & 0.5190 & 0 \\ 0 & 0 & 0 & 0.4613 \end{matrix}$$

$$\underline{V} = \begin{matrix} 0 & -0.8687 & 0.4954 & 0 \\ 0.6935+0.1218i & 0 & 0 & -0.6994-0.1228i \\ -0.0000+0.0000i & -0.0245-0.4948i & -0.043-0.8676i & 0.0000-0.0000i \\ 0.6031-0.3749i & 0 & 0 & 0.5980i-0.3717i \end{matrix}$$

The channel matrix $\underline{H}_1$ for the first subcarrier is $$\underline{H}_1 = \begin{matrix} 0.4117+0.4008i & 0.0481-0.5663i \\ 0.6456-0.1820i & 0.3024-0.1448i \end{matrix}$$

and a singular value decomposition $\underline{H}_1=\underline{U}_1\,\underline{S}_1\,\underline{V}_1$ yields $$\underline{U}_1 = \begin{matrix} -0.6579-0.3681i & 0.5577-0.3491i \\ -0.6579+0.0124i & -0.3491+0.6673i \end{matrix}$$

$$\underline{S}_1 = \begin{matrix} 0.9727 & 0 \\ 0 & 0.5190 \end{matrix}$$

$$\underline{V}_1 = \begin{matrix} -0.8687 & -0.4954 \\ -0.0245-0.4948i & 0.0430+0.8676i \end{matrix}.$$

The channel matrix $\underline{H}_2$ for the second subcarrier is $$\underline{H}_2 = \begin{matrix} -0.4081-0.1638i & -0.5830-0.7364i \\ -0.3130+1.0168i & -0.6199+0.2787i \end{matrix}$$

and a singular value decomposition $\underline{H}_2=\underline{U}_2\,\underline{S}_2\,\underline{V}_2$ yields $$\underline{U}_2 = \begin{matrix} -0.6027 - 0.1460i & 0.7845 - 0.0080i \\ -0.2657 + 0.7382i & -0.0604 + 0.6171i \end{matrix}$$

$$\underline{S}_2 = \begin{matrix} 1.5673 & 0 \\ 0 & 0.4613 \end{matrix}$$

$$\underline{V}_2 = \begin{matrix} 0.7041 & 0.7101 \\ 0.5291 - 0.4736i & -0.5247 + 0.4696i \end{matrix}.$$

One can see from this example that the second and third of singular values/vectors of $\underline{H}$ are determined by the first sub-carrier corresponding to $\underline{H}_1$ while the others are determined by the second subcarrier corresponding to $\underline{H}_2$.

In a generic sense, for MIMO-SCCP with M×M MIMO and an FFT size of N, each of the column vectors of the unitary matrices of $\underline{H}$ consists of only M non-zero elements, showing that in the multiplications by $\underline{U}^H$, $\underline{V}$ and $\underline{V}^H$ can be implemented in a very efficient way. In conclusion, for MIMO-SCCP systems with M transmitters and M receivers and an SCCP block size of N, the matrix dimension for a singular value decomposition or a matrix inversion is not NM×NM but M×M (N decompositions are necessary). Therefore, a significant complexity reduction can be achieved.

A further embodiment is described with reference to FIG. 5.

Figure 5:
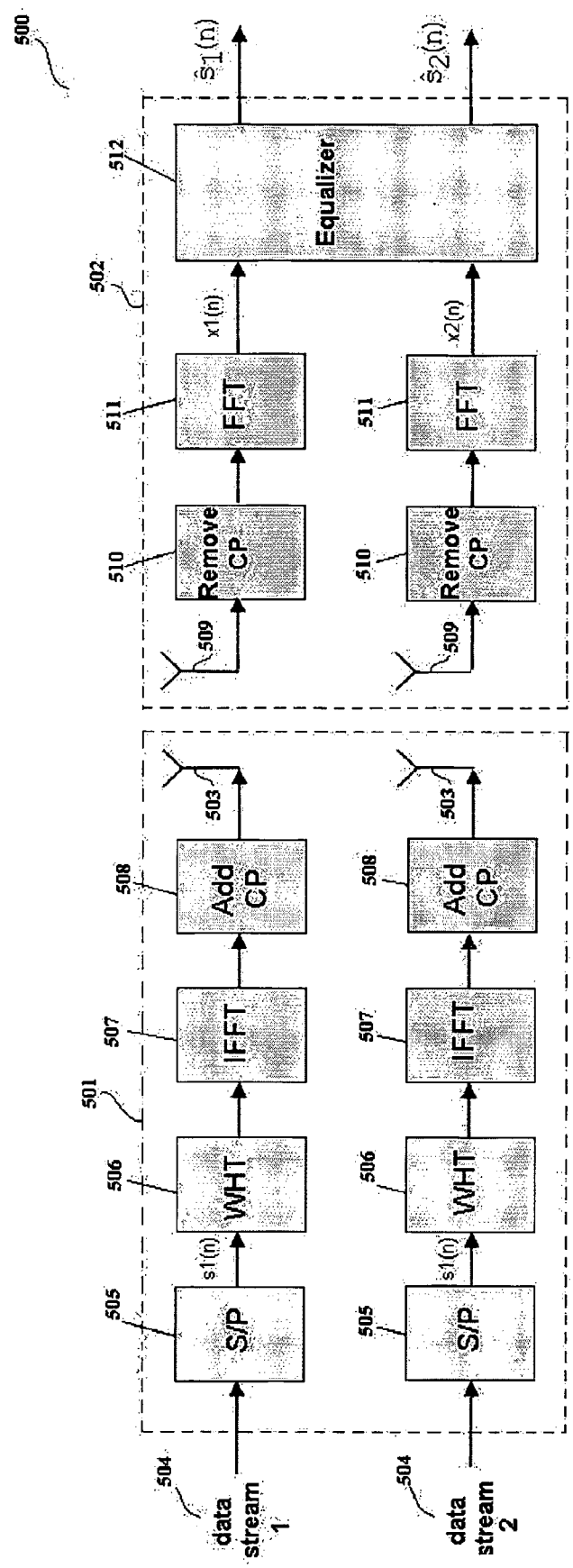
FIG. 5 shows a communication system according to an embodiment of the invention.

FIG. 5 shows a communication system 500 according to an embodiment of the invention.

The communication system 500 is a WHT-OFDM (Walsh Hadamard Transform OFDM) system with MIMO, also called MIMO-WHT-OFDM system.

The communication system 500 comprises a transmitter 501 and a receiver 502. For simplicity, the communication system 500 is a 2×2 MIMO system comprising two transmit antennas 503 wherein each transmit antenna 503 is used to transmit one data stream 504. The two data streams 504 in form of modulated symbols are each passed to a serial-to-parallel (S/P) converter 505. The S/P converters 505 generate blocks of data from the respective data streams 504. Let a block of data generated by the upper S/P converter 505 in FIG. 1 be denoted by $\underline{s}_1(n)$ and let a block of data generated by the lower S/P converter 505 in FIG. 1 be denoted by $\underline{s}_2(n)$ (assuming than $\underline{s}_1(n)$ and $\underline{s}_2(n)$ correspond to data that should be transmitted at the same time). $\underline{s}_1(n)$ and $\underline{s}_2(n)$ are vectors of size N×1 and are also referred to as the transmitted signal vectors in the following.

Each block of data $\underline{s}_1(n)$ and $\underline{s}_2(n)$ is passed to a respective Walsh-Hadamard transform (WHT) unit 506 where they are processed by a Walsh-Hadamard transform. Each of the WHT-transformed blocks of data is fed to a respective IFFT unit 507 which performs an inverse fast Fourier transform on the respective WHT-transformed block.

After WHT transformation and IFFT transformation, there is added a cyclic prefix of length L to each block by a respective cyclic prefix adding unit 508. Finally, the blocks of data are each passed to a respective parallel-to-serial (P/S) converter (not shown in FIG. 1) which generates a serial symbol stream from each block. Each serial symbol stream is then sent by a respective transmit antenna 503.

The serial symbol streams are received by the receiver 502 via respective receive antennas 509. Each received serial symbol stream is first passed to a respective S/P converter (not shown in FIG. 1) to generate a block of symbols from each received serial symbol stream. The cyclic prefix is removed from each block of symbols by a respective cyclic prefix removal unit 510 and a fast Fourier transform (of size N) is applied to each block of symbols by a respective FFT unit 511 such that a received signal vector is generated corresponding to each transmitted signal vector. Let, as above, the received signal vector corresponding to the transmitted signal vector $\underline{s}_1(n)$ be denoted by $\underline{x}_1(n)$ and let the received signal vector corresponding to the transmitted signal vector $\underline{s}_2(n)$ be denoted by $\underline{x}_2(n)$.

The received signal vectors $\underline{x}_1(n)$ and $\underline{x}_2(n)$ are fed to an equalizer 512. From $\underline{x}_1(n)$ the equalizer 512 generates a detected signal vector $\underline{\hat{s}}_1(n)$ and from $\underline{x}_2(n)$ the equalizer 512 generates a detected signal vector $\underline{\hat{s}}_2(n)$.

Because of the cyclic prefix adding, $\underline{x}_1(n)$ and $\underline{x}_2(n)$ can be written as $$\underline{x}_1(n) = \underline{\Lambda}_{11}\underline{C}\underline{s}_1(n) + \underline{\Lambda}_{21}\underline{C}\underline{s}_2(n) + \underline{u}_1(n)$$

$$\underline{x}_2(n) = \underline{\Lambda}_{12}\underline{C}\underline{s}_1(n) + \underline{\Lambda}_{22}\underline{C}\underline{s}_2(n) + \underline{u}_2(n)$$

where $\underline{x}_i(n)$, $\underline{s}_i(n)$ and $\underline{u}_i(n)$ are all column vectors with dimension N×1, and $\underline{C}$ is the WHT matrix and $\underline{\Lambda}_{ij}$ is a diagonal matrix containing the frequency domain channel responses from the ith transmit antenna to the jth receive antenna.

Therefore, the input-output relation can be written as $$\underline{x}(n) = \underline{H}\underline{s}(n) + \underline{u}(n) \qquad (15)$$

where $$\underline{x}(n) = \begin{bmatrix} x_1(n) \\ x_2(n) \end{bmatrix}, \underline{s}(n) = \begin{bmatrix} s_1(n) \\ s_2(n) \end{bmatrix}, \underline{u}(n) \begin{bmatrix} u_1(n) \\ u_2(n) \end{bmatrix} \text{ and }$$

$$\underline{H} = \overline{\underline{\Lambda}}\overline{\underline{C}}, \text{ where } \overline{\underline{\Lambda}} = \begin{bmatrix} \Lambda_{11} & \Lambda_{21} \\ \Lambda_{12} & \Lambda_{22} \end{bmatrix} \text{ and } \overline{\underline{C}} = \begin{bmatrix} C & 0 \\ 0 & C \end{bmatrix}$$

According to the input-output relation (15) the equalizer according to the embodiments described with reference to FIG. 2, FIG. 3 and FIG. 4 can be used as the equalizer 512.

$\underline{H} = \overline{\underline{\Lambda}}\overline{\underline{C}}$ and $\overline{\underline{C}}$ is a unitary matrix. Therefore, similar to a MIMO-SCCP system, as described above, singular value decomposition or matrix inversion for $\underline{H}$ can be implemented by doing singular value decomposition or matrix inversion for the block diagonal matrix $\overline{\underline{\Lambda}}$. Further, because of the block diagonality of $\overline{\underline{\Lambda}}$, the singular value decomposition or the matrix inversion of the matrix $\underline{H}$ can be done sub-carrier by sub-carrier, similar to MIMO-OFDM systems.

In conclusion, for MIMO-WHT-OFDM systems with M transmitters and M receivers and an OFDM block size of N, the matrix dimension for a singular value decomposition or a matrix inversion is not NM×NM but M×M (N decompositions are necessary). Therefore, a significant complexity reduction can be achieved.

The convergence of the iterative methods performed by the equalizers shown in FIG. 2, FIG. 3 and FIG. 4 are very sensitive to the determination of the correlation coefficients $\rho_{l-1}$, which can be considered as the reliability of the decisions made. Theoretically, the correlation coefficient $\rho_{l-1}$ can be calculated using the equalized SNR for that iteration. In [1] and [2], the correlation coefficients are determined by, for QPSK modulation, $$\rho_l = 1 - 2Q(\sqrt{\gamma_l}) \qquad (16)$$

where is the equalized SNR at the lth iteration.

This calculation is used in one embodiment and is valid when the signal dimension goes to infinity. In practice the signal dimension is small, thus using this approximation may yield a result far away from the ML (maximum likelihood) bound.

In one embodiment, the correlation coefficients are generated according to a method based on simulations. As for finite signal dimensions, the correlation fluctuates from one realization to another. The determination method is as follows. For an AWGN (average white gaussian noise) channel, the average correlation between the transmitted signals and the hard-decision symbols is calculated. This process is repeated for, e.g., 10000 runs from which 10000 realizations of correlations are obtained. Experiments show that while the mean of these realizations gets quite close to the formula (16), the realizations fluctuate quite strongly.

The correlation is chosen as the average of the two components for each SNR point: one is the theoretical value form (16) and the second is the minimum of the realizations for that SNR point. This method is referred to as Dynamic Correlation Calculation method.

In one embodiment, the method is used to set a fixed set of values for the correlation for each iteration. This method is called Fixed Correlation Calculation method. Considering that with the increase of the number of iterations, the decisions are getting better and better, the correlation coefficient is chosen as an increasing function of the iteration numbers. Typically values range from 0.8 to 0.999. For example, for four iterations the correlation coefficients $\rho_1$ to $\rho_4$ are chosen as $[\rho_1, \rho_2, \rho_3, \rho_4]=[0.95, 0.95, 0.99, 0.99]$. By doing such a simplification, even though the truly converged solution is not able to obtain, it may work very well in some SNR range for some cases, which can be seen by simulations.

In the following, it is described how the invention can be applied to different CDMA (code division multiple access) systems.

First, the input-output models for CP (cyclic prefix) based CDMA systems are presented. Considering the duality between multicarrier carrier and single carrier systems, it is started from multicarrier based CDMA systems, which are more popular than single carrier CP-based systems. Synchronous downlink transmission and single cell environment are considered for all systems.

The transmission is on a block-by-block basis, with each block consisting of the CP sub-block of P samples and the data sub-block of N samples. By adding a CP longer than the channel memory, the channel matrix becomes a circular matrix, which can be represented as $\underline{H}=\underline{W}^H\underline{\Lambda W}$, where $\underline{W}$ is the N-point DFT matrix, and $\underline{\Lambda}=\text{diag}\{\lambda_1, \ldots, \lambda_N\}$ is a diagonal matrix, the elements of which are the frequency domain channel responses in each subcarrier. Denote the time domain channel responses as $h(0), h(1), \ldots, h(L)$, each with one symbol delay, then $$\lambda_k = \sum_{l=0}^{L} h(l)\exp(-jkl/N).$$

For multicarrier systems, the data sub-block is pre-transformed before transmission using the N-point IDFT matrix $\underline{W}^H$; while for single carrier systems, the data sub-block is transmitted out directly. At the receiver side, both single carrier and multicarrier systems first pre-transform the received data sub-block with the DFT matrix $\underline{W}$, the output of which is further utilized to recover the transmitted signal via either linear or nonlinear detectors.

Denote G as the processing gain, which is common to all users. The following notations are introduced which are common for all systems: $\underline{D}(n)$ for the long scrambling codes at the nth block, $\underline{D}(n)=\text{diag}\{d(n;0), \ldots, d(n;N-1)\}$; $\underline{c}_i$ for the short codes of user i, $\underline{c}_i=[c_i(0), \ldots, c_i(G-1)]^T$, $\underline{c}_i^H\underline{c}_j=1$ for i=j, and $\underline{c}_i^H\underline{c}_j=0$ for the others.

MC-DS-CDMA

MC-DS-CDMA (multi carrier direct sequence CDMA) performs time domain spreading. Suppose that each user has equal processing gain of G, and there are T users sharing the same cell ($T \leq G$). The MC-DS-CDMA system performs block spreading as follows.

(1) Taking N symbols from each user, spreading them with users' spreading codes;

(2) The chip signals corresponding to the same symbol index from all users are summed, and are transmitted over the same subcarrier but with different blocks. Thus it takes G consecutive blocks to send out the whole chip sequences.

The nth received block after FFT operation can be written as $$\underline{y}(n) = \underline{\Lambda D}(n) \sum_{i=0}^{T-1} c_i(n)\underline{s}_i + \underline{u}(n) \tag{17}$$

where, $0 \leq n \leq G-1$, and $$\underline{y}(n)=[y(n;0), \ldots, y(n;N-1)]^T$$

$$\underline{s}_i=[s_i(0), \ldots, s_i(N-1)]^T$$

$$\underline{u}(n)=[u(n;0), \ldots, u(n;N-1)]^T \tag{18}$$

where $\underline{s}_i$ is the transmitted signal vector of size N×1 for user i; and $\underline{u}(n)$ is the AWGN after FFT operation.

From the above, the kth sub-carrier of the nth block can be conveniently represented as:

$$y(n;k) = \lambda_k d(n;k) \sum_{i=0}^{T-1} c_i(n) s_i(k).$$

Gathering the received signals of the kth sub-carrier from the 0th block to the (G−1)th block yields $$\underline{\tilde{y}}(k) = \lambda_k \underline{\tilde{D}}(k) \sum_{i=0}^{T-1} s_i(k)\underline{c}_i + \underline{\tilde{u}}(k) \tag{19}$$

where $$\underline{\tilde{y}}(k) = [y(0;k), \ldots, y(G-1;k)]^T \tag{20}$$

$$\underline{\tilde{D}}(k) = \text{diag}\{d(0;k), \ldots, d(G-1;k)\}$$

Using $\underline{\tilde{D}}(k)\underline{c}_i$ to despread $\underline{\tilde{y}}(k)$ yields $$z_i(k) = \underline{c}_i^H \underline{\tilde{D}}^H(k) \underline{\tilde{y}}(k) \tag{21}$$

$$= \lambda_k s_i(k) + u(k)$$

or

-continued $$z_i = \Delta s_i + u_i \quad (22)$$

where $\underline{z}_i=[z_i(0), \ldots, z_i(N-1)]^T$ and $\underline{u}_i=[u_i(0), \ldots, u_i(N-1)]^T$. Note $\underline{u}_i$ is a AWGN with same characteristics as $\underline{u}(n)$. Therefore, if the channel responses are constant over the entire G blocks, the MC-DS-CDMA does not experience any MAI (multiple access interference) and ISI (inter symbol interference) as long as $T \leq G$.

MC-CDMA

MC-DS-CDMA performs time spreading in the sense that the chip signals belonging to the same symbol are transmitted through different time blocks. MC-CDMA performs frequency domain spreading by transmitting those chip signals through different sub-carriers within the same block. Denote T as the total number of users; Q as the number of symbols transmitted in one block for each user; and G as the common processing gain to all users. Note N=QG is the total number of sub-carriers.

For MC-CDMA systems, the Q symbols of each user are first spread out using its own spreading codes, then the chip sequences for all users are summed up; and finally the total chip signals of size N are interleaved, and passed to an N-point IFFT processor, followed by adding a CP. At the receiver side, the nth received block after FFT can be represented as $$\underline{y}(n)=\underline{\Lambda}\Pi\underline{D}(n)\underline{C}\underline{s}(n)+\underline{u}(n) \quad (23)$$

where $\Pi$ is the interleaver matrix used to spread the transmitted chip sequence from the same symbol to possibly non-consecutive sub-carriers; and $$\underline{y}(n)=[y(n;0), \ldots, y(n;N-1)]^T$$

$$\underline{C}=\text{diag}\{\overline{C}, \ldots, \overline{C}\}$$

$$\underline{s}(n)=[\overline{s}_1^T(n), \ldots, \overline{s}_Q^T(n)]^T \quad (24)$$

where $$\overline{C}=[\underline{c}_0, \ldots \underline{c}_{T-1}]$$

$$\overline{s}_i(n)=[s_0(n;i), \ldots, s_{T-1}(n;i)]^T \quad (25)$$

Dividing the received signal vector $\underline{y}(n)$ into Q non-overlapping short column vectors, each with G elements corresponding to the chip signals belonging to the same symbol. Equation (23) can then be decoupled as $$\underline{y}_i(n)=\underline{\Lambda}_i\underline{D}_i(n)\overline{C}\overline{s}_i(n)+\underline{u}_i(n) \quad (26)$$

for i=1, ..., Q, where $\underline{\Lambda}_i$ and $\underline{D}_i(n)$ are the ith sub-block of $\underline{\Lambda}$ and $\underline{D}(n)$. Note to achieve similar frequency diversity for each transmitted symbol, the interleaver can be designed in such a way that $\underline{\Lambda}_i$ takes elements from $\underline{\Lambda}$ such that $\text{Tr}\{|\underline{\Lambda}_i|^2\}$ is almost constant for each sub-block. This can be achieved through allocating the chip signals belonging to the same symbol to equally spaced sub-carriers. From (36), it is seen that MC-CDMA experiences MAI, but not ISI. Also, signal detection can be done for each individual block.

CP-CDMA

Both MC-DS-CDMA and MC-CDMA are multicarrier systems in the sense that each data block is pre-transformed through IDFT.

Next, the single carrier dual of those systems is considered, which transmits the data blocks directly, without using any pre-transforms.

CP-CDMA is the single carrier dual of MC-CDMA. Suppose that there are T users within the same cell, and each user has the common processing gain of G. The number of symbols contained in each block for one user is Q=N/G.

For CP-CDMA systems, the Q symbols of each user are first spread out with its own spreading codes, then the chip sequence for all users are summed up; the total chip signal of size N is then passed to CP inserter, which adds a CP. Using the duality between CP-CDMA and MC-CDMA, from (23), the nth received block of CP-CDMA after FFT can be written as $$\underline{y}(n)=\underline{\Lambda}\underline{W}\underline{D}(n)\underline{C}\underline{s}(n)+\underline{u}(n) \quad (27)$$

where $\underline{y}(n)$, $\underline{C}$, and $\underline{s}(n)$ are defined same as in MC-CDMA case. From (27), it is seen that CP-CDMA experiences both MAI and ISI for each block, thus powerful signal processing is required in order to recover the transmitted signals.

CP-DS-CDMA

CP-DS-CDMA is the single carrier dual of MC-DS-CDMA. Denote T as the total number of users; N the number of subcarriers for each block; and G the common processing gain to all users. The CP-DS-CDMA system performs block spreading as follows: the N symbols of each user are first spread out with its own spreading codes, then the chip sequence for all users are summed up; the total chip signal corresponding to different chip index is transmitted over different time block, thus it takes G blocks to send out the whole chip sequence of the N symbols.

The nth received block after FFT can be written as $$\underline{y}(n) = \underline{\Lambda}\underline{W}\underline{D}(n)\sum_{i=0}^{T-1} c_i(n)\underline{s}_i + \underline{u}(n) \quad (28)$$

where $n = 0, \ldots, G-1$, and $$\underline{y}(n) = [y(n; 0), \ldots, y(n; N-1)]^T \quad (29)$$

$$\underline{s}_i = [s_i(0), \ldots, s_i(N-1)]^T$$

$$\underline{u}(n) = [u(n; 0), \ldots, u(n; N-1)]^T$$

If the same set of long scrambling codes are applied to the G blocks, i.e., $\underline{D}(0)= \ldots =\underline{D}(G-1)=\underline{D}$, by collecting the kth sub-carrier's received signals from the 0th to (G−1)th blocks, one obtains $$\tilde{\underline{y}}(k) = \lambda_k \sum_{i=0}^{T-1} \underline{W}(k,:)\underline{D}\underline{s}_i\underline{c}_i + \tilde{\underline{u}}(k) \quad (30)$$

where $\tilde{\underline{y}}(k)=[y(0;k), \ldots, y(G-1;k)]^T$, and $\underline{W}(k,:)$ denotes the kth row of $\underline{W}$. Note $\underline{W}(k,:)\underline{D}\underline{s}_i$ is a scaler. Using $\underline{c}_i$ to perform despreading, one obtains $$z_i(k) = \underline{c}_i^H \tilde{\underline{y}}(k) \quad (31)$$

$$= \lambda_k \underline{W}(k,:)\underline{D}\underline{s}_i + \tilde{u}(k)$$

Thus

-continued $$z_i = \underline{A}W D \underline{s}_i + \underline{u}_i \quad (32)$$

where $\underline{z}_i=[z_i(0), \ldots, z_i(N-1)]^T$ and $\underline{u}_i=[u_i(0), \ldots, u_i(N-1)]^T$. Note (32) is the single carrier duality of MC-DS-CDMA model (22), if D=I. From (32), it is seen that CP-DS-CDMA does not experience MAI, but it does have ISI. It is also noted that after block despreading, a CP-DS-CDMA system is equivalent to a single carrier CP(SCCP) system.

Now, consider the generic MIMO channel model. Suppose the MIMO channel is described by the following input-output relation:

$$\underline{x} = \underline{H}\underline{s} + \underline{n} \quad (33)$$

where $\underline{s}$, $\underline{x}$ and $\underline{n}$ denote the transmitted signal vector, received signal vector, and received noise vector, respectively; $\underline{H}$ is the channel matrix, representing the responses from the transmit antennas to the receive antennas. Without loss of generality, it is assumed that $\underline{s}$, $\underline{x}$ and $\underline{n}$ are all N×1 vectors, and $\underline{H}$ is a N×N matrix. Assuming that $\epsilon[\underline{s}\underline{s}^H]=\sigma_s^2\underline{I}$, $\epsilon[\underline{n}\underline{n}^H]=\sigma_n^2\underline{I}$, $\epsilon[\underline{s}\underline{n}^H]=0$. Denote $\underline{P}$ as the linear equalizer for the channel (33), which generates the output:

$$\underline{z} = \underline{P}^H\underline{x} \quad (34)$$

Then, the minimum mean square error (MMSE) equalizer is given by $$\underline{P}_{MMSE} = \sigma_s^2[\sigma_s^2\underline{H}\underline{H}^H + \sigma_n^2\underline{I}]^{-1}\underline{H} \quad (35)$$

In the following, the linear receivers for each of the CP-based CDMA systems are specified.

MC-DS-CDMA performs block despreading for each sub-carrier using G consecutive blocks. A one-tap equalizer is then applied to the despreading output to retrieve the transmitted signals. The MMSE equalizer to the ith sub-carrier is given by $$p_i, \text{MMSE} = \frac{\sigma_s^2 \lambda_i}{\sigma_s^2 \lambda_i^2 + \sigma_n^2} \quad (36)$$

For MC-CDMA, the signal separation is done for each sub-block. As the channel matrix for the ith sub-block of the nth block is $$\underline{H}_i = \underline{A}_i \underline{D}_i(n)\overline{\underline{C}} \quad (37)$$

Thus the MMSE equalizer is given by, for fully loaded systems, $$\underline{P}_{i,MMSE} = \sigma_s^2[\sigma_s^2|\underline{A}_i|^2 + \sigma_n^2\underline{I}]^{-1}\underline{A}_i\underline{D}_i(n)\overline{\underline{C}} \quad (38)$$

which is realized through a one-tap equalizer, $(\sigma_s^2[\sigma_s^2|\underline{A}_i|^2 + \sigma_n^2\underline{I}]^{-1}\underline{A}_i)^H$, followed by a despreader $[\underline{D}_i(n)\overline{\underline{C}}]^H$.

For CP-CDMA, the channel matrix for the nth block is given by $$\underline{H} = \underline{A}WD(n)\overline{\underline{C}} \quad (39)$$

Thus the MMSE equalizer is given by, for fully loaded systems, $$\underline{P}_{MMSE} = \sigma_s^2[\sigma_s^2|\underline{A}|^2 + \sigma_n^2\underline{I}]^{-1}\underline{A}D(n)\overline{\underline{C}} \quad (40)$$

which is realized through a one-tap equalizer, $(\sigma_s^2[\sigma_s^2|\underline{A}|^2 + \sigma_n^2\underline{I}]^{-1}\underline{A})^H$, followed by an IDFT operator $\underline{W}^H$, followed by a despreader $[\underline{D}(n)\overline{\underline{C}}]^H$.

CP-DS-CDMA performs block despreading using G consecutive blocks, the channel matrix after despreading is given by $$\underline{H} = \underline{A}W \quad (41)$$

Thus the MMSE equalizer is given by $$\underline{P}_{MMSE} = \sigma_s^2[\sigma_s^2|\underline{A}|^2 + \sigma_n^2\underline{I}]^{-1}\underline{A}W \quad (42)$$

which is realized through a one-tap equalizer, $(\sigma_s^2[\sigma_s^2|\underline{A}|^2 + \sigma_n^2\underline{I}]^{-1}\underline{A})^H$, followed by a IDFT operator $\underline{W}^H$.

After block despreading, a CP-DS-CDMA system becomes a SCCP system, and similarly, a MC-DS-CDMA becomes an OFDM system.

Next, linear equalizers according to embodiments of the invention are described, which are applied to the various CDMA systems.

Linear equalizers are easy for implementation, however, they are single user detectors in the sense that when detecting one symbol, the others are all treated as interferences. BI-GDFE (block iterative generalized decision feedback equalizer) is utilized to achieve near-ML detection for the CP-based CDMA systems. The idea is to detect the transmitted symbols iteratively and simultaneously (but not jointly), and in each iteration, the decisions made at the previous iteration are used to cancel out the interferences, such that statistically maximized SINRs are achieved for all detected symbols.

Figure 6:
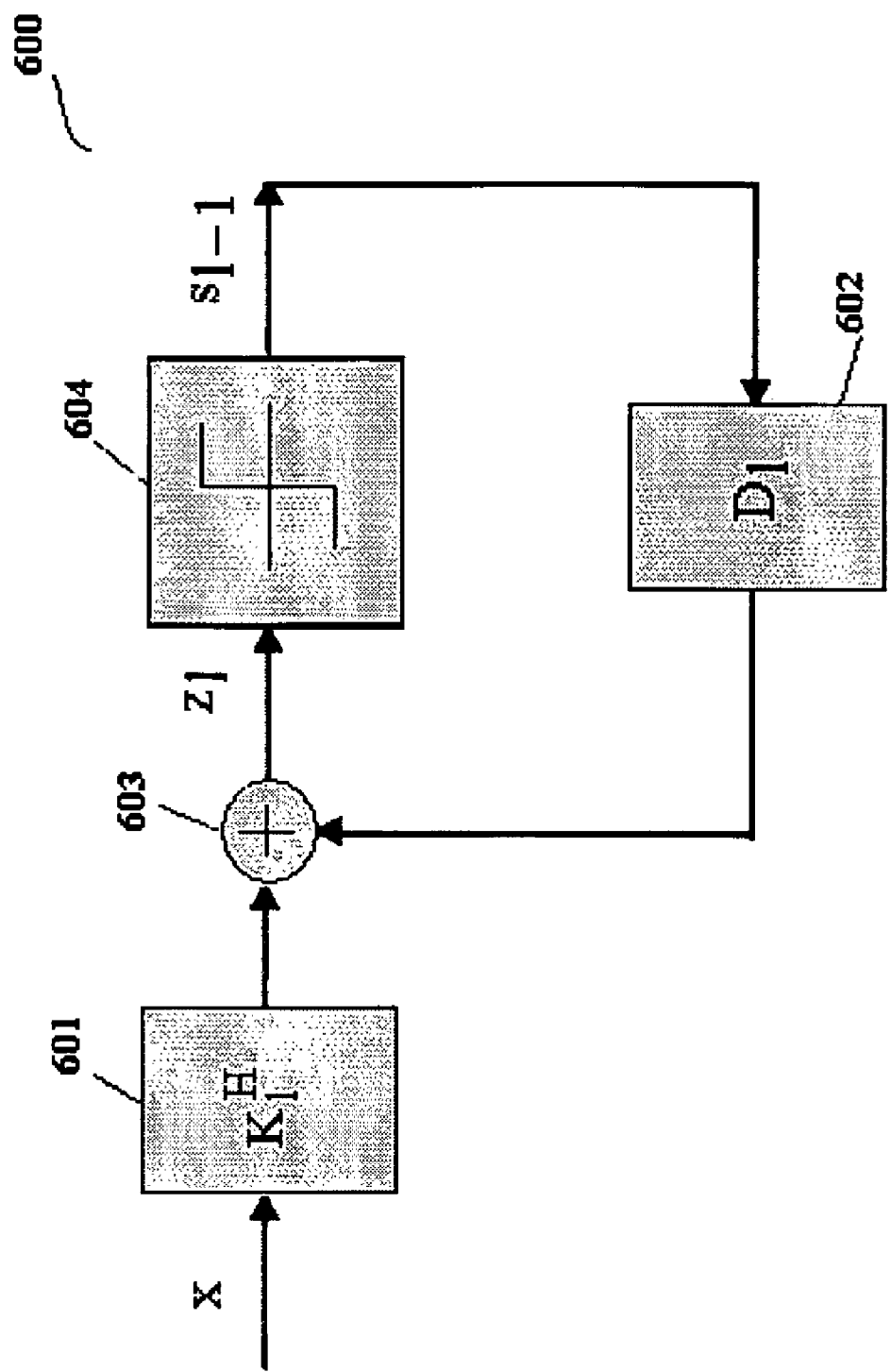
FIG. 6 shows an equalizer according to an embodiment of the invention.

FIG. 6 shows an equalizer 600 according to an embodiment of the invention.

The subscript l is used to denote the lth iteration. The equalizer 600, a BI-GDFE, makes use of the decision-directed symbols from the (l−1)th iteration to assist for signal detection for the lth iteration. At the lth iteration, the received signal x is passed to a feed-forward equalization (FFE) unit 601 corresponding to a matrix $K_l$; at the same time, the hard decision from the (l−1)th iteration, $\hat{s}_{l-1}$, passes through a feedback equalizer (FBE) 602 corresponding to a matrix $D_l$. The outputs from the FFE unit 601 and the FBE 602 are combined by a combiner 603, and further used by a slicer 604 to make hard decisions for the lth iteration. Let $$\underline{z}_l = \underline{K}_l^H\underline{x} + \underline{D}_l\hat{\underline{s}}_{l-1} \quad (43)$$

The key idea for BI-GDFE can be seen in that preserve the signal component $\underline{s}$ from the FFE is preserved, while cancelling out the interferences using the FBE.

Theorem 1:

Suppose that $\epsilon[\underline{s}\underline{s}^H]=\sigma_s^2\underline{I}$, $\epsilon[\underline{s}\hat{\underline{s}}_{l-1}^H]=\rho_{l-1}\sigma_s^2\underline{I}$, and $\epsilon[\hat{\underline{s}}_{l-1}\hat{\underline{s}}_{l-1}^H]=\sigma_s^2\underline{I}$. Denote $\underline{A}_l=\text{diag}(\underline{K}_l^H\underline{H})$, which takes the diagonal elements of $\underline{K}_l^H\underline{H}$, then the optimal FFE and FBE maximizing the signal to interference plus noise ratio (SINR) at the lth iteration are given by $$\underline{K}_l = \sigma_s^2[\sigma_s^2(1-\rho_{l-1}^2)\underline{H}\underline{H}^H + \sigma_n^2\underline{I}]^{-1}\underline{H} \quad (44)$$

$$\underline{D}_l = \rho_{l-1}(\underline{A}_l - \underline{K}_l^H\underline{H}) \quad (45)$$

and the maximum SINR for the kth symbol of s is given by $$\gamma_l(k) = \frac{|\underline{A}_l(k,k)|^2 \sigma_s^2}{R_{\tilde{n}_l}(k,k)} \quad (46)$$

$$R_{\tilde{n}_l} = \frac{\sigma_s^2(1-\rho_{l-1}^2)}{\rho_{l-1}^2}D_lD_l^H + \sigma_n^2K_lK_l^H \quad (47)$$

and X(i,j) denotes the elements of matrix X at the ith row and jth column.

Theorem 2: Suppose that $\epsilon[\underline{ss}^H]=\sigma_s^2\underline{I}$, $\epsilon[\underline{s}\hat{\underline{s}}_{l-1}^H]=\rho_{l-1}\sigma_s^2\underline{I}$, and $\epsilon[\hat{\underline{s}}_{l-1}\hat{\underline{s}}_{l-1}^H]=\sigma_s^2\underline{I}$. Consider the MIMO channel of $\underline{x}=\underline{H}\underline{s}+\underline{n}$, and suppose channel matrix $\underline{H}$ can be decomposed as: $\underline{H}=\underline{H}_0\underline{E}$, where $\underline{E}$, called a transform matrix, is a unitary matrix, i.e., $\underline{EE}^H=\underline{I}$. Denote $\underline{K}_{l,0}$ and $\underline{D}_{l,0}$ as the FFE and FBE at the lth iteration of the MIMO channel: $\underline{x}=\underline{H}_0\underline{s}+\underline{n}$, and $\underline{A}_{l,0}$=diag($\underline{K}_{l,0}^H\underline{H}_0$). Then the following holds (1) The FFE $\underline{K}_l$ and FBE $\underline{D}_l$ of the MIMO channel $\underline{x}=\underline{H}\underline{s}+\underline{n}$ can be represented as $$\underline{K}_l=\underline{K}_{l,0}\underline{E} \tag{48}$$

$$\underline{D}_l=\underline{E}^H\underline{D}_{l,0}\underline{E}+\rho_{l-1}(\text{diag}(\underline{E}^H\underline{K}_{l,0}^H\underline{H}_0\underline{E})-\underline{E}^H\underline{A}_{l,0}\underline{E}) \tag{49}$$

(2) If $\underline{H}_0$ is a diagonal matrix, and the elements of $\underline{E}$ are all with the same amplitude, then $\underline{K}_{l,0}$ and $\underline{A}_{l,0}=\underline{K}_{l,0}^H\underline{H}_0$ are diagonal matrices, and $$\underline{K}_l^H\underline{H} = \underline{E}^H\underline{A}_{l,0}\underline{E} \tag{50}$$

$$\underline{A}_l = \alpha_l I \tag{51}$$

$$\underline{D}_l = \rho_{l-1}\underline{E}^H(\alpha_l I - \underline{A}_{l,0})\underline{E} \tag{52}$$

$$R_{\tilde{n}_l}(k,k) = \frac{1}{N}Tr(\underline{R}_{l,0}) \tag{53}$$

where $$\alpha_l = \frac{1}{N}Tr(\underline{A}_{l,0}),$$

and $$\underline{R}_{l,0}=\sigma_s^2(1-\rho_{l-1}^2)(\underline{A}_{l,0}-\alpha_l\underline{I})(\underline{A}_{l,0}-\alpha_l\underline{I})^H+\sigma_n^2\underline{K}_{l,0}^H\underline{K}_{l,0} \tag{54}$$

is a diagonal matrix.

Several comments are in order.

- The diagonal elements of the FBE $\underline{D}_l$ are all zeros, thus the earlier-made decisions will never contribute to the signal components in the slicer input $\underline{z}_l$;
- The parameter $\rho_{l-1}$ is called the cross-correlation coefficient between the transmitted signal $\underline{s}$ and the hard decisions $\hat{\underline{s}}_{l-1}$ made at the (l–1)th iteration. The selection of this coefficient plays a critical role to guarantee the convergence of the iterative algorithm. For the initialization, $\rho_0$=0 is set, thus the FFE $\underline{K}_1$ is actually the conventional MMSE equalizer, and there is no feedback. When the previously-made decisions are perfect, the correlation coefficient is 1, the FBE cancels out all the interferences, and the FFE becomes a matched filter, $\underline{H}$, or maximal-ratio combining (MRC) equalizer.
- If $\underline{H}_0$ is a diagonal matrix, and the elements of $\underline{E}$ are all with the same amplitude, then the FFE and FDE for $\underline{H}$ can be decomposed into two terms, those related to the fundamental channel $\underline{H}_0$ and the transform matrix $\underline{E}$. Further, the SINR for the channel $\underline{H}$ is independent of the transform. However, this is not the case when the transform $\underline{E}$ has uneven amplitudes for its elements.

With the above theory, the BI-GDFE is applied to each of the CP-based CDMA systems, and derive the optimal equalizers for each iteration. As MC-DS-CDMA after block despreading is equivalent to a OFDM system, its ML detection is achieved through one-tap equalizer directly. However, the mathematical formula for OFDM systems serve as the fundamentals in deriving the optimal weights for the other CP-based CDMA systems. Thus the MC-DS-CDMA systems are considered first.

MC-DS-CDMA

After block despreading, a MC-DS-CDMA system is equivalent to (22). Denote $\underline{H}_0=\underline{\Lambda}$, then $$\underline{K}_{l,0}=\sigma_s^2[\sigma_s^2(1-\rho_{l-1}^2)|\underline{\Lambda}|^2+\sigma_n^2\underline{I}]^{-1}\underline{\Lambda} \tag{55}$$

$$D_{l,0}=0 \tag{56}$$

Note both $\underline{H}_0$ and $\underline{K}_{l,0}$ are diagonal matrices.

MC-CDMA

For MC-CDMA, each time block consists of Q sub-blocks, the channel matrix for the ith sub-block of the nth block is given by $$\underline{H}_i=\underline{\Lambda}_i\underline{D}_i(n)\underline{C} \tag{57}$$

Define $\underline{E}=\underline{D}_i(n)\underline{C}$, and note that the elements of $\underline{E}$ have the same amplitude. For fully loaded systems, $\underline{EE}^H=\underline{I}$. Applying Theorem 2 and the results for MC-DS-CDMA systems, the FFE and FBE for the lth iteration is obtained as follows:

$$\underline{K}_{l,i}=\underline{F}_{l,i}\underline{D}_i(n)\underline{C} \tag{58}$$

$$\underline{D}_{l,i}=\rho_{l-1,i}([\underline{D}_i(n)\underline{C}]^H\underline{B}_{l,i}\underline{D}_i(n)\underline{C}) \tag{59}$$

where $$\underline{F}_{l,i}=\sigma_s^2[\sigma_s^2(1-\rho_{l-1,i}^2)|\underline{\Lambda}_i|^2+\sigma_n^2\underline{I}]^{-1}\underline{\Lambda}_i \tag{60}$$

$$\underline{B}_{l,i}=a_{l,i}\underline{I}-\underline{F}_{l,i}^H\underline{\Lambda}_i \tag{61}$$

where $$a_{l,i} = \frac{Q}{N}Tr(\underline{E}_{l,i}^H\underline{\Lambda}_1),$$

and $\rho_{l-1,i}$ is the correlation between the transmitted signal $\underline{s}_i$ and the decisions $\hat{\underline{s}}_{l-1,i}$ made at the (l–1)th iteration, which can be calculated through the SINRs:

$$\gamma_{l,i}(k) = \frac{N\bar{a}_{l,i}^2\sigma_s^2}{QTr(\sigma_s^2(1-\rho_{l-1,i}^2)B_{l,i}B_{l,i}^H+\sigma_n^2E_{l,i}^HE_{l,i})}, \forall k \tag{62}$$

Note that $\underline{F}_{l,i}$ and $\underline{B}_{l,i}$ are both diagonal matrices, representing one-tap equalizers. An equalizer for MC-CDMA is shown in FIG. 7.

Figure 7:
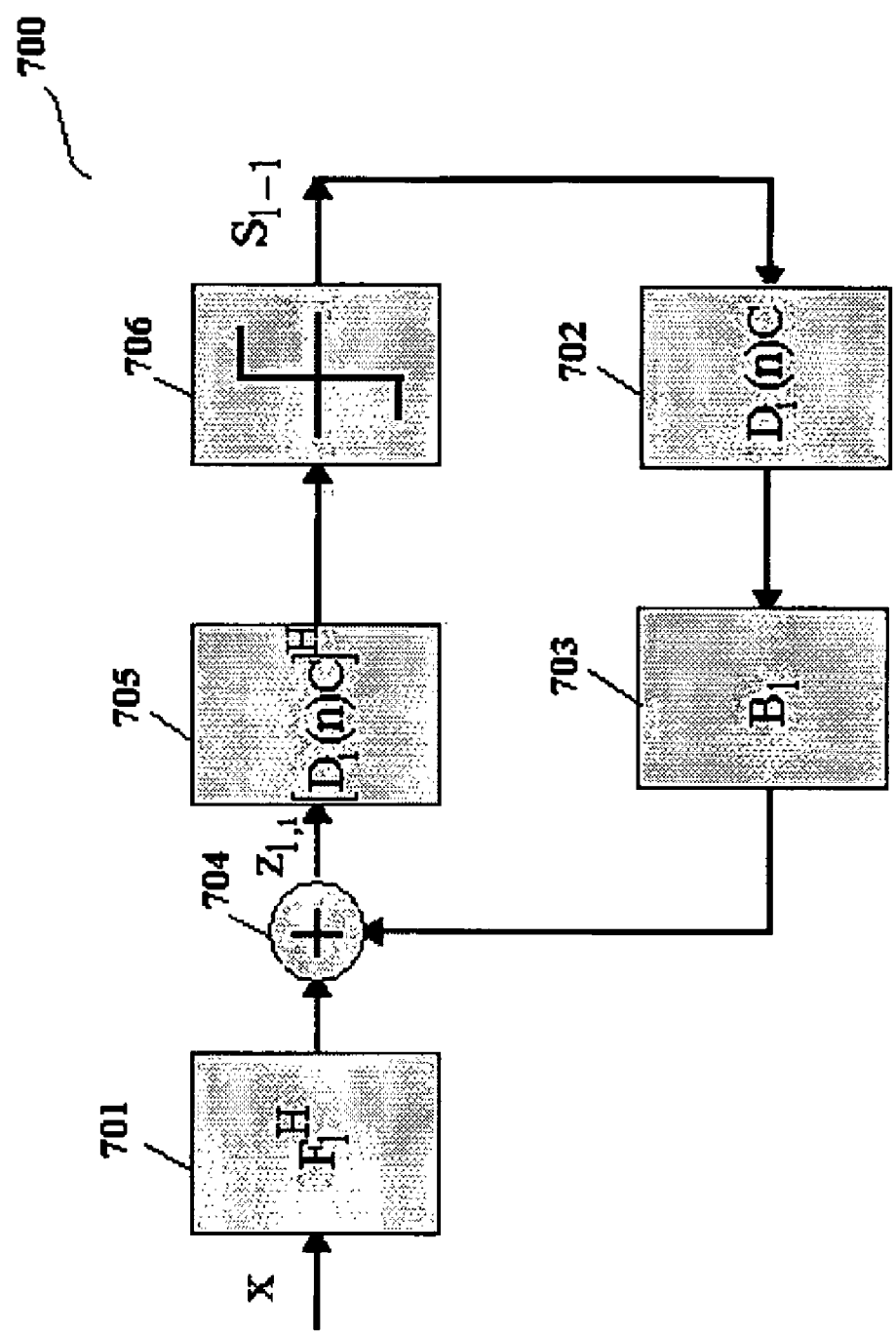
FIG. 7 shows an equalizer according to an embodiment of the invention.

FIG. 7 shows an equalizer 700 according to an embodiment of the invention.

At the lth iteration, the received signal x is passed to a feed-forward equalization (FFE) unit 701 corresponding to the matrix $\underline{F}_l^H$; at the same time, the hard decision from the (l–1)th iteration, $\hat{s}_{l-1}$, passes through a first processing unit 702 corresponding to the matrix $\underline{D}_i(n)\underline{C}$. The output of the first processing unit 702 is processed by a second processing unit 703 corresponding to the matrix $\underline{B}_l$. The outputs from the FFE unit 701 and the second processing unit 703 are combined by a combiner 704, and after being processed by a third processing unit 705 corresponding to the matrix $[\underline{D}_i(n)\underline{C}]^H$, the output of the combiner 704 is used by a slicer 706 to make hard decisions for the lth iteration.

Finally, for partially loaded systems, a scaling factor can be added in the per-subcarrier equalizer $\underline{F}_{l,i}$, yielding $$E_{l,i} = \sigma_s^2 \left[ \frac{T}{G} \sigma_s^2 (1 - \rho_{l-1,i}^2) |\Delta_i|^2 + \sigma_n^2 I \right]^{-1} \Delta_i$$

CP-CDMA

For CP-CDMA, the channel matrix for the nth block is as follows:

$$\underline{H} = \underline{\Delta WD}(n)\underline{C} \quad (63)$$

Define $\underline{E} = \underline{WD}(n)\underline{C}$. For fully loaded systems, $\underline{EE}^H = \underline{I}$. Applying Theorem 2 and the results for MC-DS-CDMA systems, one obtains the FFE and FBE for the lth iteration as follows:

$$\underline{K}_l = \underline{F}_l \underline{WD}(n)\underline{C} \quad (64)$$

$$\underline{D}_l = \rho_{l-1}(\underline{A}_l - [\underline{D}_l(n)\underline{C}]^H \underline{W}^H \underline{F}_l^H \underline{\Delta WD}(n)\underline{C}) \quad (65)$$

where $$\underline{F}_l = \sigma_s^2 [\sigma_s^2(1-\rho_{l-1}^2)|\underline{\Delta}|^2 + \sigma_n^2 \underline{I}]^{-1} \underline{\Delta} \quad (66)$$

$$\underline{A}_l = \text{diag}([\underline{WD}(n)\underline{C}]^H \underline{F}_l^H \underline{\Delta WD}(n)\underline{C}) \quad (67)$$

Notice since the elements of E do not have identical amplitude, the FBE $\underline{D}_l$ cannot be decouple the effect of pure channel $\underline{\Delta}$ from those of the codes. Thus the equalized SINRs will also be different for different detected symbols. Finally, for partially loaded systems, a scaling factor can be added in the per-subcarrier equalizer $\underline{F}_l$, yielding $$\underline{E}_l = \sigma_s^2 \left[ \frac{T}{G} \sigma_s^2 (1 - \rho_{l-1,i}^2) |\Delta_i|^2 + \sigma_n^2 I \right]^{-1} \Delta.$$

CP-DS-CDMA

After block despreading, the channel matrix for CP-DS-CDMA is given by $$\underline{H} = \underline{\Delta W} \quad (68)$$

Thus the FFE and FBE for the lth iteration are as follows $$\underline{K}_l = \underline{F}_l \underline{W} \quad (69)$$

$$\underline{D}_l = \rho_{l-1}(\underline{W}^H \underline{B}_l \underline{W}) \quad (70)$$

where $$\underline{F}_l = \sigma_s^2 [\sigma_s^2(1-\rho_{l-1}^2)|\underline{\Delta}|^2 + \sigma_n^2 \underline{I}]^{-1} \underline{\Delta} \quad (71)$$

$$\underline{B}_l = a_l \underline{I} - \underline{F}_l^H \underline{\Delta} \quad (72)$$

where $$a_l = \frac{1}{N} Tr(\underline{F}_l^H \underline{\Delta}).$$

For CP-based CDMA systems, the composite channel matrix consists of the pure channel responses from the transmitter side to the receiver side, and the spreading codes associated with the active users. When the long scrambling codes are utilized $\underline{D}(n) \neq \underline{I}$, the FFE $\underline{K}_l$ and FBE $\underline{D}_l$ are dependent on the channel responses, as well as the long scrambling codes. For MC-CDMA and CP-DS-CDMA systems, the effects from these two factors can be decoupled, thus both $\underline{F}_l$ and $\underline{B}_l$ are independent of the long codes. However, for CP-CDMA, the optimal FBE $\underline{D}_l$ cannot decouple the effects from these two factors. Further, the equalized SINRs are also dependent on the long spreading codes. Thus when BI-GDFE is applied, the receiver complexity for CP-CDMA is in general higher than those for the other two systems.

In the following, a suboptimal simplified solution is proposed to design the equalizers and calculate the SINRs for CP-CDMA systems with long scrambling codes.

One may argue that only short orthogonal codes can be used. However, only using short codes may incur very bad performance for CP-CDMA.

With reference to the equations (64) and (65)

$$\bar{a}_l = \frac{1}{N} Tr(\underline{A}_l) \quad (73)$$

$$\underline{B}_l = \rho_{l-1}(\bar{a}_l \underline{I} - \underline{F}_l^H \underline{\Delta}) \quad (74)$$

$$\underline{G}_l = \rho_{l-1}(\underline{A}_l - \bar{a}_l \underline{I}) \quad (75)$$

are defined.

Then the FBE for the lth iteration can be represented as $$\underline{D}_l = [\underline{WD}(n)\underline{C}]^H \underline{B}_l \underline{WD}(n)\underline{C} + \underline{G}_l \quad (76)$$

Note $\underline{F}_l$ in equation (66) and $\underline{B}_l$ above are both diagonal matrices, thus they are one-tap equalizers. However, since the diagonal elements of $\underline{A}_l$ are not identical, an additional block $\underline{G}_l$ is used to fulfil this diagonality requirement for $\underline{B}_l$. An equalizer for CP-CDMA is shown in FIG. 8.

Figure 8:
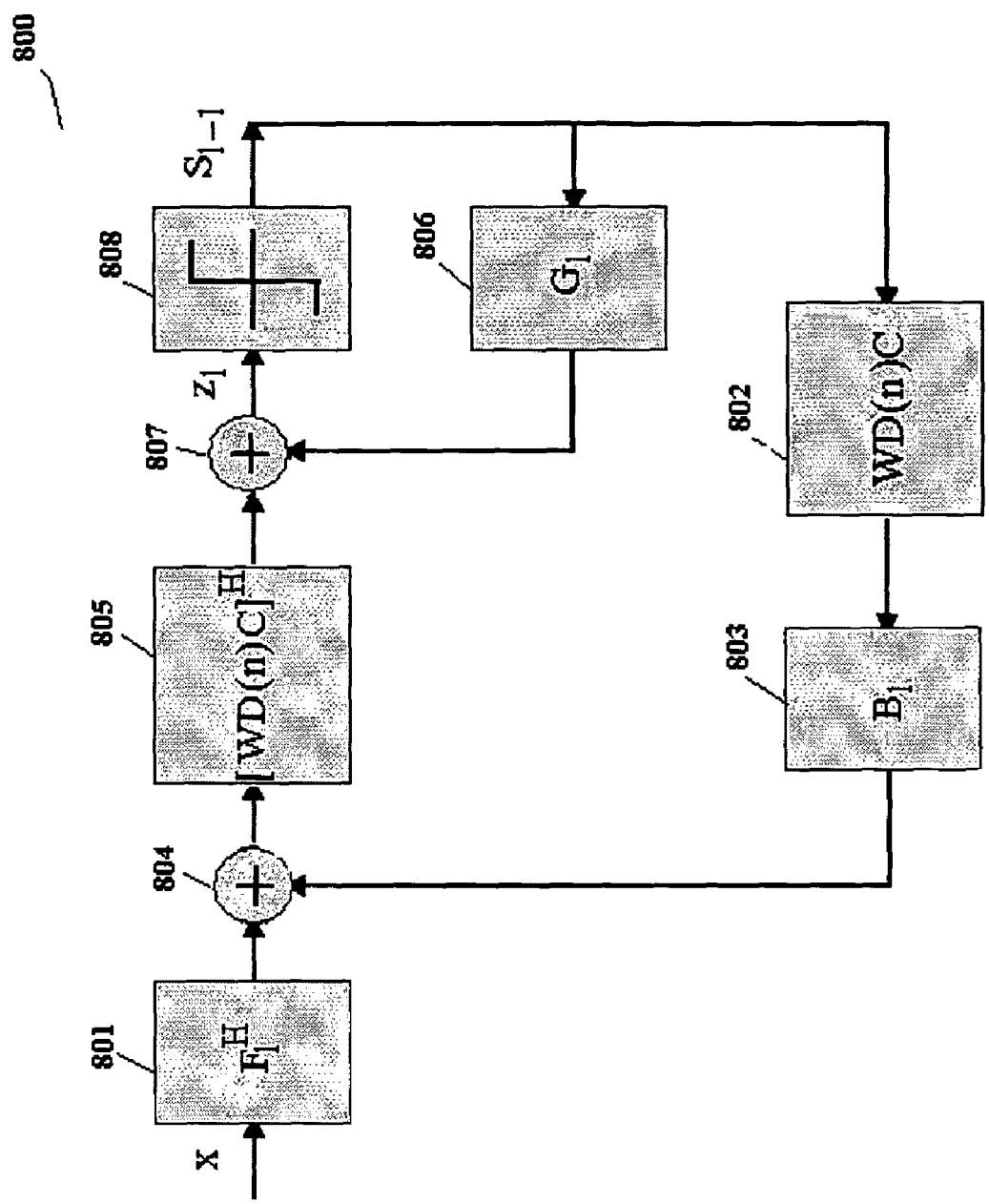
FIG. 8 shows an equalizer according to an embodiment of the invention.

FIG. 8 shows an equalizer 800 according to an embodiment of the invention.

At the lth iteration, the received signal x is passed to a feed-forward equalization (FFE) unit 801 corresponding to the matrix $\underline{F}_l^H$; at the same time, the hard decision from the (l−1)th iteration, $\hat{s}_{l-1}$, passes through a first processing unit 802 corresponding to the matrix $\underline{WD}(n)\underline{C}$. The output of the first processing unit 802 is processed by a second processing unit 803 corresponding to the matrix $\underline{B}_l$. The outputs from the FFE unit 801 and the second processing unit 803 are combined by a first combiner 804, the output of which is processed by a third processing unit 805 corresponding to the matrix $[\underline{WD}(n)\underline{C}]^H$. The hard decision from the (l−1)th iteration, $\hat{s}_{l-1}$ is also processed by a fourth processing unit 806 corresponding to the matrix $G_l$. The outputs of the fourth processing unit 806 and the third processing unit 805 are combined by a second combiner 807, the output of which is used by a slicer 808 to make hard decisions for the lth iteration.

Further, since both $\bar{a}_l$ and $\underline{G}_l$ are dependent on the long codes, $\underline{D}(n)$, they have to be calculated and updated from one block to another, rendering the implementation of BI-GDFE very complicated. To simplify the calculations, two suboptimal techniques are proposed.

Suboptimal BI-GDFE-I:

$$\bar{a}_l = \frac{1}{N} Tr(\underline{F}_l^H \underline{\Delta}) \quad (77)$$

$$\gamma_l(k) = \frac{N \bar{a}_l^2 \sigma_s^2}{Tr(\sigma_s^2(1-\rho_{l-1}^2)/\rho_{l-1}^2 \underline{B}_l \underline{B}_l^H + \sigma_n^2 \underline{F}_l^H \underline{F}_l)}, \forall k \quad (78)$$

$$\underline{G}_l = \rho_{l-1}(\underline{A}_l - \bar{a}_l \underline{I}) \quad (79)$$

Suboptimal BI-GDFE-II:

$$\bar{a}_l = \frac{1}{N} Tr(E_l^H \Delta) \quad (80)$$

$$\gamma_l(k) = \frac{N \bar{a}_l^2 \sigma_s^2}{Tr(\sigma_s^2(1-\rho_{l-1}^2)/\rho_{l-1}^2 B_l B_l^H + \sigma_n^2 E_l^H E_l)}, \forall k \quad (81)$$

$$\underline{G}_l = 0 \quad (82)$$

Figure 9:
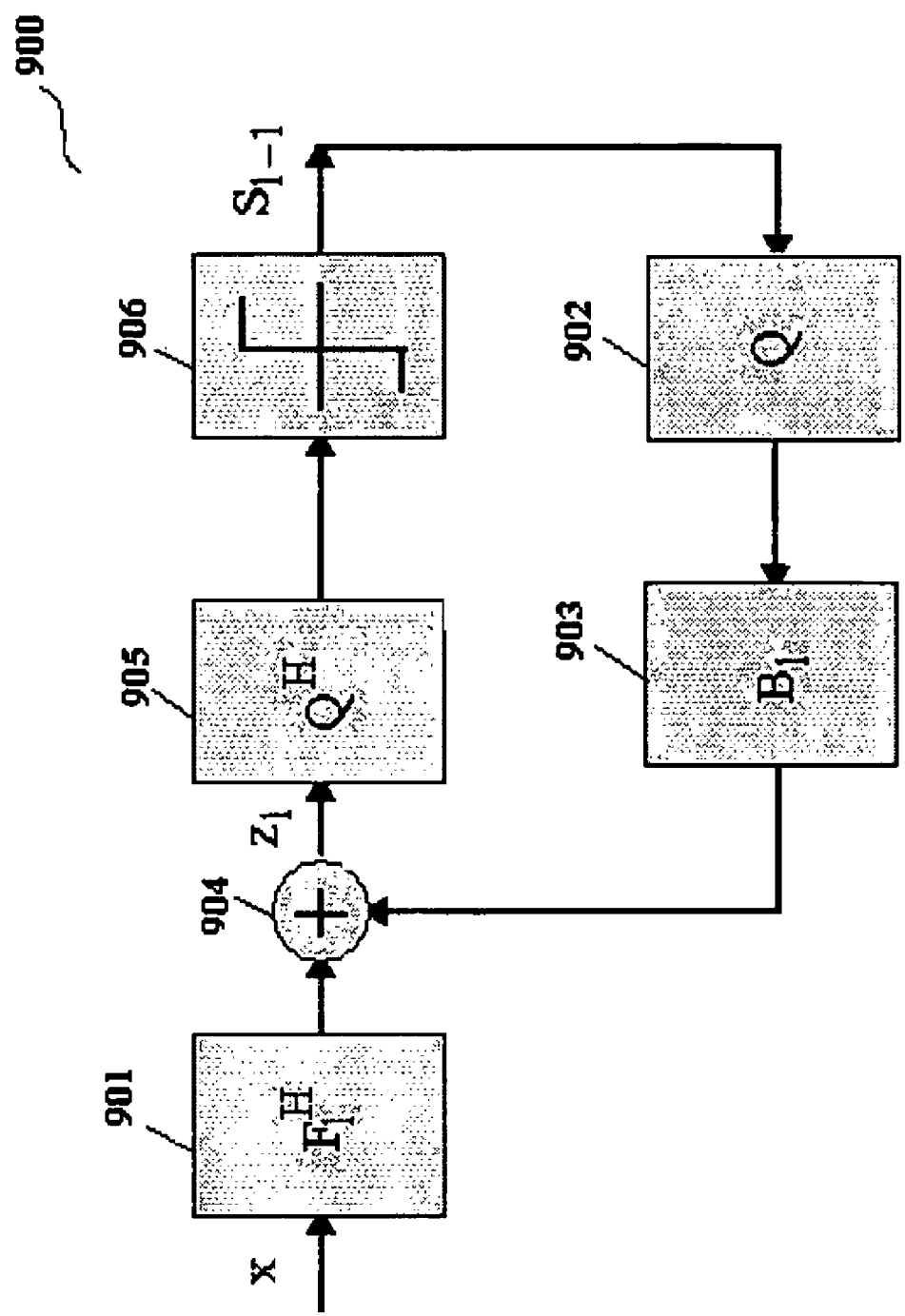
FIG. 9 shows an equalizer according to an embodiment of the invention.

With these simplifications, a reconfigurable BI-GDFE receiver applicable to any type of CP-based CDMA systems is proposed and shown in FIG. 9. It corresponds to the equalizer shown in FIG. 4, wherein instead of $\underline{V}$, the matrix Q is used.

FIG. 9 shows an equalizer 900 according to an embodiment of the invention.

At the lth iteration, the received signal x is passed to a feed-forward equalization (FFE) unit 901 corresponding to the matrix $\underline{F}_l^H$; at the same time, the hard decision from the (l-1)th iteration, $\hat{s}_{l-1}$, passes through a first processing unit 902 corresponding to the matrix $\underline{Q}$. The output of the first processing unit 902 is processed by a second processing unit 903 corresponding to the matrix $\underline{B}_l$. The outputs from the FFE unit 901 and the second processing unit 903 are combined by a combiner 904, and after being processed by a third processing unit 905 corresponding to the matrix $Q^H$, the output of the combiner 904 is used by a slicer 906 to make hard decisions for the lth iteration.

The FFE (FFE unit 901) and FBE (second processing unit 903) are both one tap equalizers, and are determined by the pure physical channel, thus they can be predetermined;

The transform matrix Q is configured as follows: Q= $\underline{WD}(n)\underline{C}$ for CP-CDMA, Q=$\underline{D}(n)\underline{C}$ for MC-CDMA, Q= $\underline{W}$ for CP-DS-CDMA, Q=0 for MC-DS-CDMA (meaning MC-DS-CDMA does not require iterations).

Block dispreading is performed for MC-DS-CDMA and CP-DS-CDMA.

When iterations are not performed, the proposed receiver is equivalent to conventional MMSE receiver.

For DS-CDMA systems, there is no CP for each block. Conventionally, two types of low-complexity receivers have been proposed for DS-CDMA downlink: Rake receiver, and equalization receiver. The performance of each depends on the property of the wireless channel, as well as the traffic load. Specifically, a Rake receiver is effective in suppressing both inter-finger interference (IFI) and MAI when the spreading factor is large enough; however, this interference suppression capability will decrease with the increase of the traffic load. An equalization receiver is in theory capable of suppressing both IFI and MAI coming from the same cell for CDMA downlink, through restoring the orthogonality of the codes. However, considering the complexity constraint and slow convergence of any practical adaptive equalization algorithms, the achievable performance of an equalization receiver usually has a big gap to the theoretically predicted performance.

However, even though there is no CP, the input-output relation of (27) approximately satisfies when the channel delay spread is relatively small compared to the block size. Thus FEQ method can still be applied to conventional DS-CDMA systems. Therefore, the BI-GDFE scheme designed for CP-CDMA using FEQ is still applicable for conventional DS-CDMA.

Finally, the proposed scheme can also be applied to any systems varied from MC-CDMA, such as time-frequency spreading MC-CDMA, and CP-CDMA. Also, while an equalizer weight design for downlink scenarios is provided, the application of the proposed method in uplink scenario is straightforward. Further, when MIMO is applied to MC-CDMA, CP-CDMA and others, the dimension of matrix used for SVD or matrix inversion is still determined by the spatial dimension provided by the MIMO channel, thus a very simple iterative receiver can be expected.

As above, the convergence of the proposed iterative receiver is very sensitive to the determination of the input-decision correlation coefficient $\rho_l$. If the signal dimension is infinity, the correlation coefficient can be theoretically calculated based on the equalized SNR for the lth iteration using Gaussian approximation. For example, in [1], [2], the correlation coefficient is determined by, for QPSK modulation, $$\rho_l = 1 - 2Q(\sqrt{\gamma_l}) \quad (83)$$

where $\gamma_l$ is the equalized SINR at the lth iteration.

It is pointed out that this method is valid only when the signal dimension goes to infinity, and the equalized SINRs at each detected symbol are identical. In practice, the signal dimension is usually small, and further, the equalized SINRs are not identical for different detected symbols for some systems, such as CP-CDMA considered in this paper. Therefore, it is desirable to design a robust method to calculate the correlations applicable to systems with finite signal dimension and unequal equalized SINRs.

For systems with finite signal dimension, the input-decision correlations fluctuate from one realization to another. Here a robust method to determine the correlations based on Monte Carlo simulations is described. It works as follows.

(1) For an AWGN channel with SNR γ, generate a block of N modulated symbols, and make hard decisions over the received signals, then calculate the cross-correlation between the transmitted signals with the hard-decision symbols. Repeat this process for say 10000 runs, from 10000 realizations of correlation are obtained, for given SNR γ.

(2) Calculate the mean of these correlations, which should be close to the formula of (83) for QPSK modulation;

(3) Search the minimum of the correlation from the 10000 runs. This minimum is actually the worst case correlation.

(4) Calculate the average between the mean correlation and minimum correlation, and this value is served as the correlation for the pair of SNR γ and block size N, irrespective the Monte Carlo runs.

(5) Vary the SNR γ from say −20 dB to say 20 dB, and obtain the correlation-SNR curves.

A lookup table can be generated based on the measured curves, and when the systems have identical equalized SINR, the checked value can be applied directly. For systems with unequal equalized SINRs, two ways can be applied. One is to use the geometric mean of the SINRs of the detected symbols.

In this case, the noise covariance matrix has to be calculated. Also, calculation of geometric mean can be very extensive. The other solution is to use the average SINR, defined as the ratio between the average signal power and average interference plus noise power. This method simplifies the calculations quite significantly.

Several comments are in order.

(1) For finite signal dimensions, if the correlation is overestimated, then a close-to-MRC weights are designed for the FFE, and it is regarded that most of the interference is cancelled out, even though this is not the case. Convergence may not be achieved for such a case.

(2) One way is to choose the minimum correlation at each SNR as the correlation measure. While this may generally lead to a converged solution, the convergence speed is usually very slow.

(3) By selecting the input-decision correlation as the average of the minimum and the mean of the simulated correlations, it makes a tradeoff between convergence speed and guarantee of convergence in most of the cases.

(4) Another simple method is to set a fixed set of values for the correlation. The selection of this correlation set can be done through Monte Carlo simulations.

Figure 10:
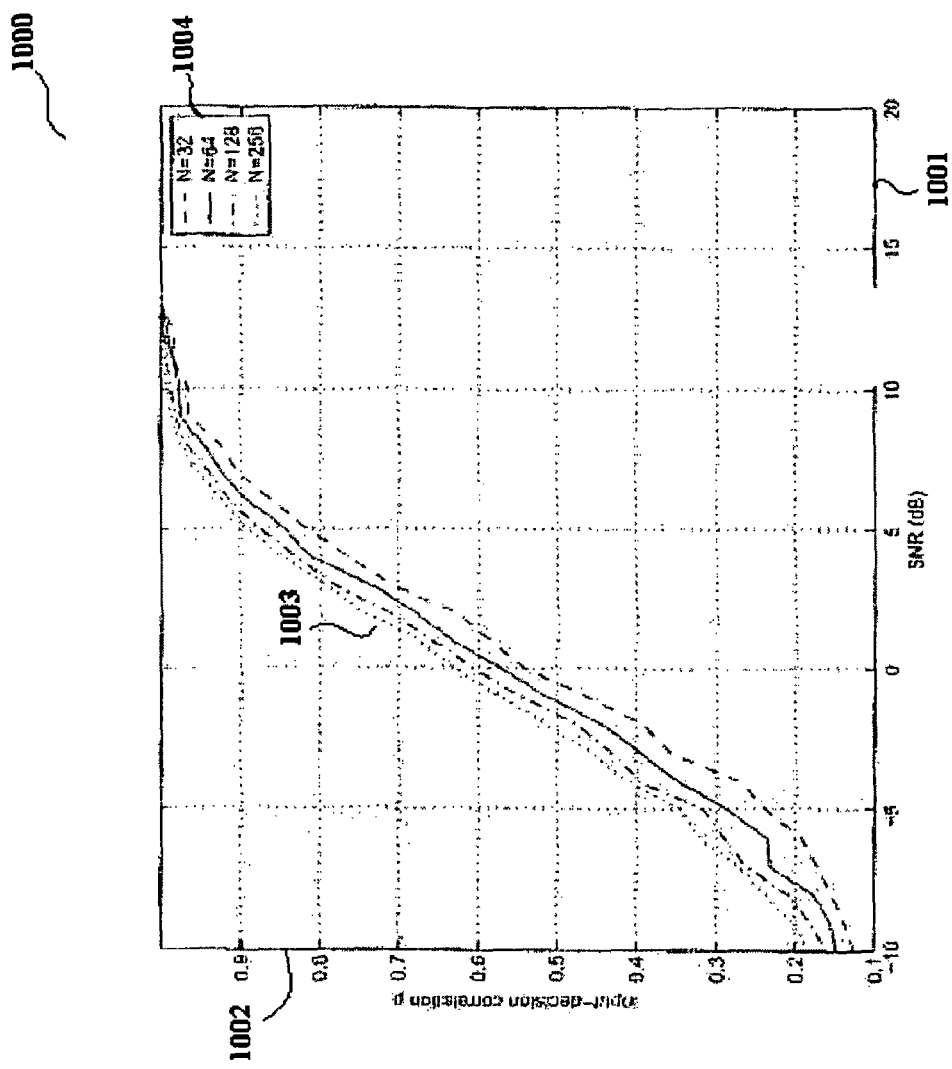
FIG. 10 shows a diagram according to an embodiment of the invention.

Input-decision correlations for different signal-to-noise ratios and different signal dimensions according to simulations are shown in FIG. 10.

FIG. 10 shows a diagram 1000 according to an embodiment of the invention.

For different signal-to-noise ratios, indicated on the x-axis 1001 of the diagram 1000, input-decision correlations ρ are determined by way of simulation, in this case by 2000 Monte Carlo runs. The input-decision correlations ρ are indicated on the y-axis 1002 of the diagram 1000.

The correspondence of signal-to-noise ratio to correlation ρ is indicated by a plurality of curves 1003, each curve 1003 corresponding to a signal dimension, as it is indicated in the box 1004.

It can be seen that with the increase of block size (signal dimension), the input-decision correlation becomes less fluctuated. Therefore, a larger correlation coefficient can be applied in designing the FBE.

From simulations one sees that the achievable performance of BI-GDFE does not converge to a curve parallel to the MFB (matched filter bound), implying that there could be some problems for either the conventional MC-CDMA or the BI-GDFE. The reason behind this is that the conventional MC-CDMA actually does not achieve the full diversity of the system. In order to achieve the full diversity the channel contains and to assist for the proposed BI-GDFE to achieve such diversity, in one embodiment, a new MC-CDMA system is used.

Different from conventional MC-CDMA which spreads the transmitted symbol in frequency domain, and then transforms the spread chip signals using inverse FFT (IFFT), the proposed MC-CDMA inserts a random interleaver of size N between the spreader and IFFT operators. With this modification, the proposed MC-CDMA with BI-GDFE achieves the full diversity the wireless channel contains.

In this document, the following publications are cited:

[1] Beheshti, S. H. Isabelle and G. W. Wornel, "Joint intersymbol and multiple access interference suppression algorithms for CDMA systems," European Trans. Telecomm. Related Technol., vol. 9, pp. 403-418, September-October 1998

[2] A. M. Chan and G. W. Wornell, "A class of block-iterative equalizers for intersymbol interference channels: fixed channel results," IEEE Trans. on Communications, pp. 1966-1976, vol. 49, No. 11, November 2001

[3] N. Benvenuto and S. Tomasin, "Block iterative DFE for single carrier modulation", Electronics Letters, pp. 1144-1145, vol. 38, No. 19, September 2002

[4] R. Kalbasi, R. Dinis, D. D. Falconer and A. H. Banihashemi, "Layered space-time receivers for single carrier transmission with iterative frequency domain equalization", IEEE VTC-Spring '04, May 2004

The invention claimed is:

1. A method for equalizing a digital signal received via at least one communication channel, comprising:

the signal values of the received digital signal are grouped into at least one block of received signal values;

the at least one block of received signal values is processed by an iterative equalizer;

in two or more iterations, a block of equalized signal values for the block corresponding to a current iteration is generated;

in two or more iterations the block of equalized signal values corresponding to a previous iteration is processed by a feedback unit which performs a multiplication by a first matrix;

in two or more iterations the at least one block of received signal values is processed by a feed-forward unit which performs a multiplication by a second matrix;

in two or more iterations, the first matrix is updated;

in two or more iterations, the second matrix is updated;

in two or more iterations, the block of equalized signal values corresponding to the current iteration is determined based on the combination of the output of the feed-forward unit and the output of the feedback unit for the current iteration;

wherein the first matrix and the second matrix are updated based on a correlation between the block of equalized signal values corresponding to a previous iteration and the block of received signal values.

2. The method according to claim 1, wherein the first matrix is updated based on the result of at least one previous iteration.

3. The method according to claim 1, wherein the second matrix is updated based on the result of at least one previous iteration.

4. The method according to claim 1, wherein in each iteration, a block of equalized signal values for the block corresponding to the iteration is generated.

5. The method according to claim 1, wherein in two or more iterations, the first matrix and the second matrix are updated.

6. The method according to claim 1, wherein in each iteration, the first matrix is updated.

7. The method according to claim 1, wherein in each iteration, the second matrix is updated.

8. The method according to claim 1, wherein the correlation between the block of equalized signal values corresponding to a previous iteration and the block of received signal values is determined based on an equalized SINR of the previous iteration.

9. The method according to claim 1, wherein the correlation between the block of equalized signal values corresponding to a previous iteration and the block of received signal values is determined based on pre-determined correlation values.

10. The method according to claim 9, wherein the pre-determined correlation values are generated by means of simulations.

11. The method according to claim 1, wherein the second matrix is updated based on a maximisation of a signal to interference and noise ratio.

12. The method according to claim 1, wherein the first matrix is updated based on a minimisation of the interference.

13. The method according to claim 1, wherein the received digital signal is a digital signal received via a MIMO system comprising a plurality of receive antennas and each receive antenna corresponds to exactly one component of the block of received signal values.

14. The method according to claim 13, wherein in two or more iterations, the block of received signal values is processed by a first beamforming unit which performs a multiplication by a third matrix and wherein the block of equalized signal values corresponding to a previous iteration is processed by a second beamforming unit which performs a multiplication by a fourth matrix.

15. The method according to claim 14, wherein the third matrix and the fourth matrix correspond to a singular value decomposition of a channel matrix specifying the transmission characteristics of the communication channel.

16. The method according to claim 15, wherein the singular value decomposition of the channel matrix is performed based on a decomposition of the channel matrix according to subcarriers used in the communication channel.

17. The method according to claim 1, wherein the first matrix and the second matrix are generated according to a channel matrix specifying the transmission characteristics of the communication channel.

18. The method according to claim 1, wherein the communication channel is adapted according to MC-DS-CDMA, MC-CDMA, CP-CDMA or CP-DS-CDMA.

19. An equalizer for equalizing a digital signal received via at least one communication channel, comprising:
   the signal values of the received digital signal are grouped into at least one block of received signal values,
   the equalizer is adapted to process the at least one block of received signal values iteratively,
   in two or more iterations, the equalizer generates a block of equalized signal values for the block corresponding to a current iteration;
   and wherein the equalizer comprises:
   a feedback unit which performs a multiplication by a first matrix and is adapted to process the block of equalized signal values corresponding to a previous iteration in two or more iterations;
   a feed-forward unit which performs a multiplication by a second matrix and is adapted to process the at least one block of received signal values in two or more iterations;
   a first updating unit which is adapted to update the first matrix in two or more iterations;
   a second updating unit which is adapted to update the second matrix in two or more iterations;
   a determining unit, adapted to determine the block of equalized signal values corresponding to the current iteration in two or more iterations based on the combination of the output of the feed-forward unit and the output of the feedback unit for the current iteration;
   wherein the first matrix and the second matrix are updated based on a correlation between the block of equalized signal values corresponding to a previous iteration and the block of received signal values.

* * * * *